(12) United States Patent
Honsinger

(10) Patent No.: US 12,057,682 B2
(45) Date of Patent: Aug. 6, 2024

(54) NODE PEDESTAL

(71) Applicant: PPC BROADBAND, INC., East Syracuse, NY (US)

(72) Inventor: Brian P. Honsinger, Warners, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 731 days.

(21) Appl. No.: 17/126,017

(22) Filed: Dec. 17, 2020

(65) Prior Publication Data

US 2021/0185840 A1   Jun. 17, 2021

Related U.S. Application Data

(60) Provisional application No. 62/949,371, filed on Dec. 17, 2019.

(51) Int. Cl.
*H02B 1/50* (2006.01)
*G02B 6/44* (2006.01)
*G02B 6/50* (2006.01)
*H04Q 1/02* (2006.01)

(52) U.S. Cl.
CPC ..................... *H02B 1/50* (2013.01)

(58) Field of Classification Search
CPC ........ H02B 1/50; G02B 6/4441; G02B 6/504; H04Q 1/021; H05K 7/186; H02G 9/10
See application file for complete search history.

(56) References Cited

U.S. PATENT DOCUMENTS

| 4,585,141 | A | * | 4/1986 | Marks | E02D 29/1427 220/326 |
|---|---|---|---|---|---|
| 5,412,960 | A | * | 5/1995 | James | E05C 3/12 312/334.32 |
| 6,182,846 | B1 | * | 2/2001 | Leschinger | H02B 1/50 174/37 |
| 6,362,419 | B1 | * | 3/2002 | Gallagher | H02B 1/50 174/37 |
| 6,916,985 | B1 | * | 7/2005 | Harwood | H02G 9/10 174/37 |
| 2002/0060456 | A1 | * | 5/2002 | Linares | E05C 3/145 292/103 |
| 2005/0189133 | A1 | | 9/2005 | Harwood | |

(Continued)

OTHER PUBLICATIONS

Search Report dated Mar. 8, 2021 in corresponding International Application No. PCT/US20/65776, 2 pages.

(Continued)

*Primary Examiner* — Timothy J Thompson
*Assistant Examiner* — Amol H Patel
(74) *Attorney, Agent, or Firm* — MH2 TECHNOLOGY LAW GROUP LLP

(57) ABSTRACT

A node pedestal includes a box configured to house communication system components, a housing configured to be removably coupled with the box and having opposite end walls, a pair of supports extending from the box at opposite ends of the box, and a locking mechanism configured to latch the housing with the box. The locking mechanism includes a latch rotatingly mounted to a first one of the end walls and a catch extending from a first one of the supports in a direction toward a second one of the supports, and the latch is configured to engage the catch to secure the housing to the box.

13 Claims, 30 Drawing Sheets

(56) References Cited

U.S. PATENT DOCUMENTS

| | | | |
|---|---|---|---|
| 2005/0275319 A1* | 12/2005 | Wittmeier | H05K 7/186 |
| | | | 312/100 |
| 2006/0254794 A1* | 11/2006 | Burke | H02G 3/0493 |
| | | | 174/38 |
| 2008/0083192 A1 | 4/2008 | Schlegel | |
| 2009/0050363 A1* | 2/2009 | Maloney | H02B 1/50 |
| | | | 16/221 |
| 2017/0054277 A1 | 2/2017 | Unger et al. | |
| 2019/0123533 A1 | 4/2019 | Huffstetler et al. | |

OTHER PUBLICATIONS

Written Opinion dated Mar. 8, 2021 in corresponding International Application No. PCT/US20/65776, 8 pages.

\* cited by examiner

NODE PEDESTAL

CROSS-REFERENCE TO RELATED APPLICATION

This application claims the benefit of U.S. Provisional Application No. 62/949,371, filed Dec. 17, 2019, the disclosure of which is hereby incorporated by reference herein in its entirety.

BACKGROUND

The present disclosure relates to node pedestals and, in particular, to above-ground fiber node pedestals. Conventionally, underground utility enclosures are characterized by underground installations in which a sealed pedestal housing with splice connections is stored in a grade level enclosure. Alternatively, conventional above-ground pedestals are characterized by installations with access for connections to be made when adding a new service, for example.

SUMMARY

According to various aspects of the disclosure, a node pedestal includes a box configured to house communication system components, a housing configured to be removably coupled with the box and having opposite end walls, a pair of supports extending from the box at opposite ends of the box, and a locking mechanism configured to latch the housing with the box. The locking mechanism includes a latch rotatingly mounted to a first one of the end walls and a catch extending from a first one of the supports in a direction toward a second one of the supports, and the latch is configured to engage the catch to secure the housing to the box.

In some aspects, the pedestal housing includes a lower hood and an upper hood configured to be coupled to one another.

In some aspects, the lower hood includes an upper wall having at least one opening that dissipates heat toward the upper hood, a peripheral opening between the upper hood and the lower hood exhausts heat out of the node pedestal.

In various aspects, the lower hood includes side walls having openings that allow air to flow into the housing to dissipate heat generated by an electrical component enclosed in the node pedestal.

In some aspects, the side walls include vanes that define the openings, the vanes extending inward from an outer surface of the lower hood such that when airflow hits the vanes, the airflow is already inside the housing, and the airflow is further directed into an interior of the housing.

In various aspects, the crossbeam has an elongated slot extended along a length of the crossbeam. In some aspects, the electrical component includes a hook portion configured to receive and be placed over the crossbeam. In some aspects, the hook portion includes a through hole configured to be aligned with the slot and to receive a carriage bolt, and the bolt is configured to be threadedly coupled with a nut to secure the electrical component to the box at a desired position along the length of the crossbeam.

BRIEF DESCRIPTION OF THE DRAWINGS

Features and advantages of the present disclosure are described in, and will be apparent from, the following Brief Description of the Drawings and Detailed Description.

FIG. 5F is a front view of the exemplary locking mechanism of the exemplary pedestal of FIG. 1.

DETAILED DESCRIPTION OF EMBODIMENTS

Figure 1:
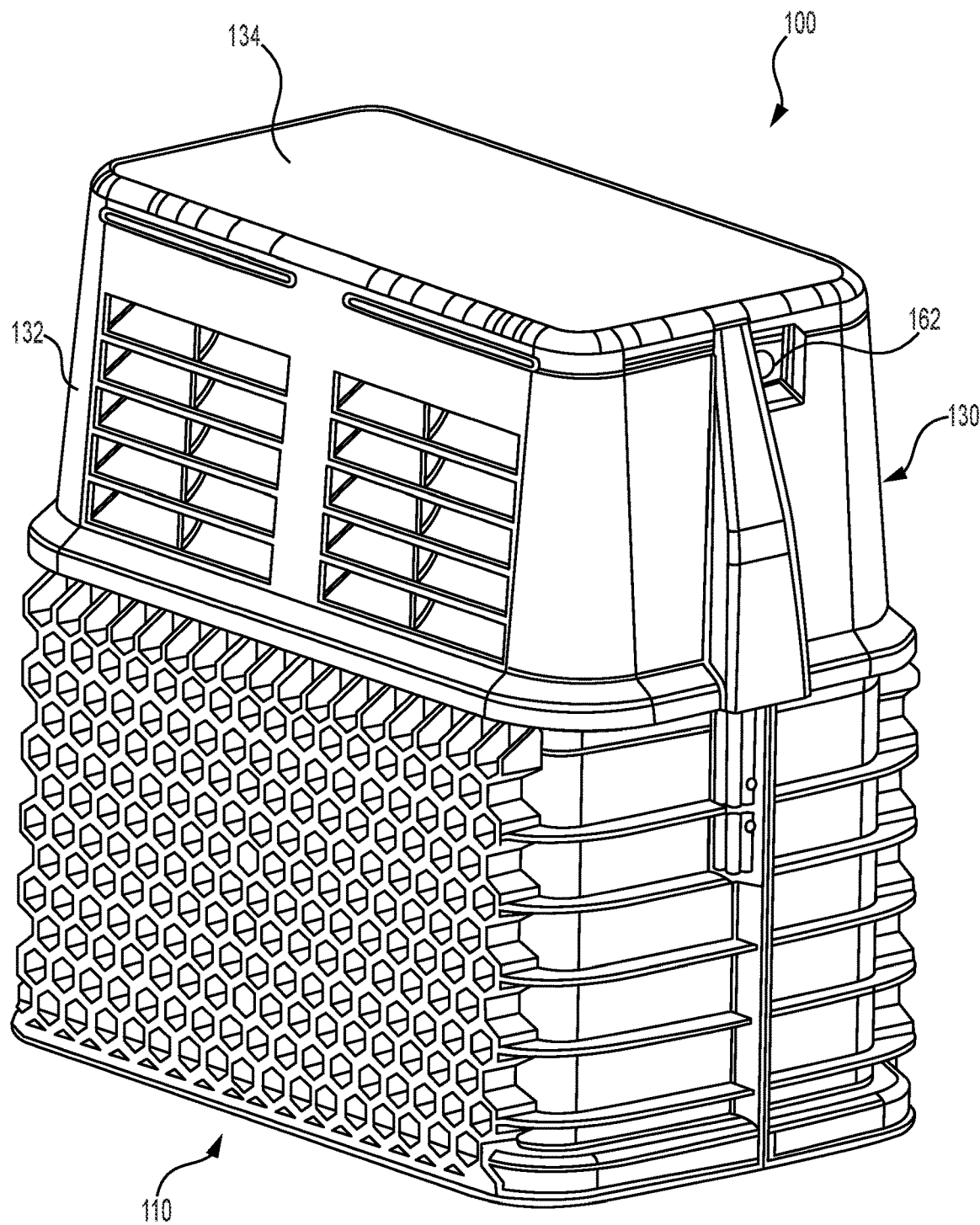
FIG. 1 is a perspective view of an exemplary node pedestal in accordance with various aspects of the disclosure.

Throughout the description, like reference numerals will refer to like parts in the various drawing figures. As a preface to the detailed description, it should be noted that, as used in this specification and the appended claims, the singular forms "a", "an," and "the" include plural referents, unless the context clearly dictates otherwise Referring to FIGS. 1-10, an exemplary node pedestal 100, for example, a fiber node pedestal is illustrated. The pedestal 100 includes a grade level box 110 and a pedestal housing 130. The grade level box 110 can have various embodiments, typically buried below-ground with an open bottom to receive wiring attached to electrical components stored within the pedestal housing 130. The pedestal housing 130 protects the underground utility connections when they are brought above-ground for connecting to service lines from the customer, for example. The grade level box 110 itself, being placed below-ground, can contain electrical connections such as utility cables or conduits, data transmission lines, service lines, optical fiber cables and other underground utility devices, lines or cables. One use is for containing fiber optic tubes having optical fibers for splice connections when providing residential fiber optic service connections.

Figure 2:
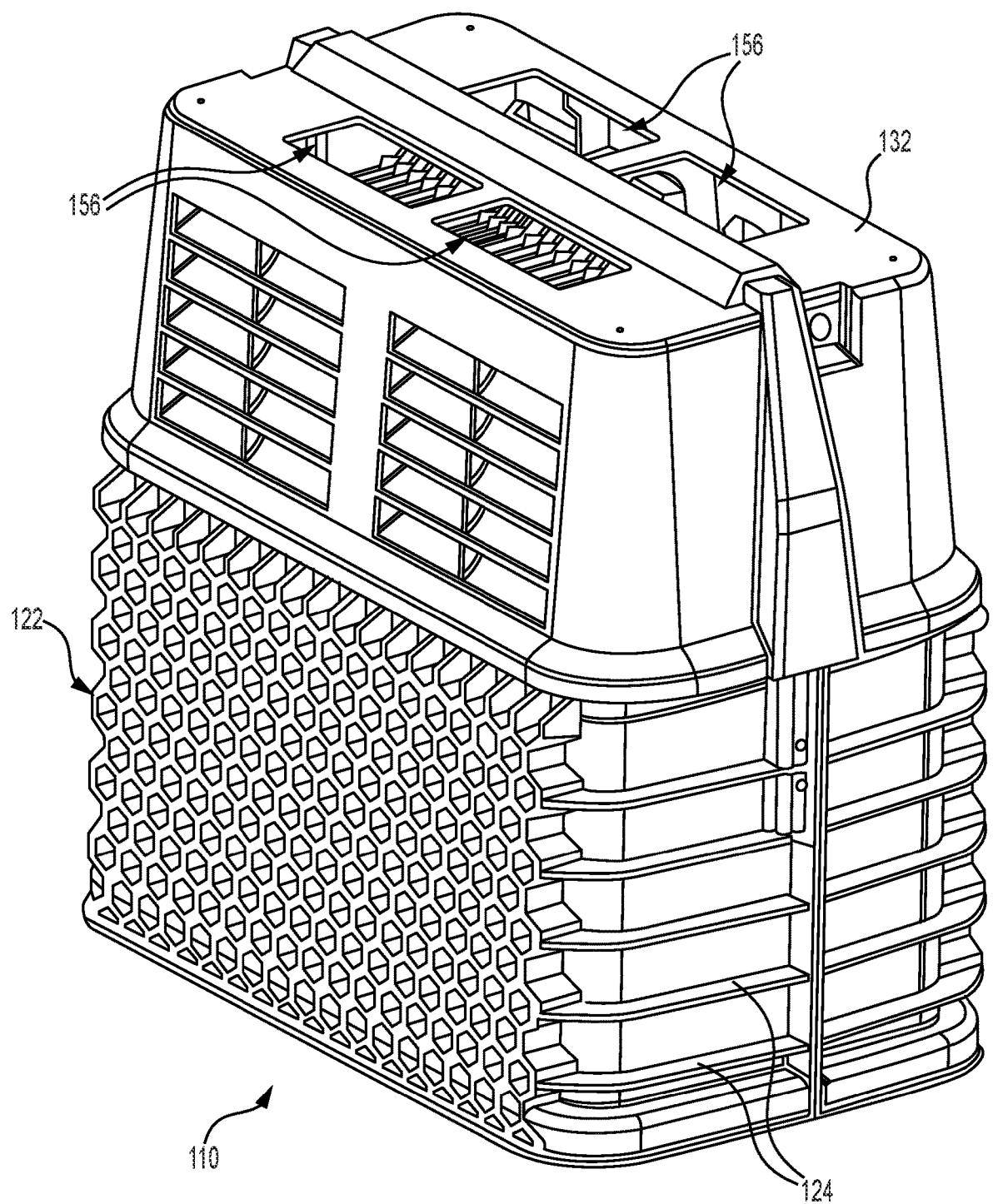
FIG. 2 is a perspective view of the box of the exemplary node pedestal of FIG. 1.

Referring to FIGS. 1 and 2, the box 110 includes side walls 112 and end walls 114. The side walls 112 have hexagonal strength structures 122, which provide a higher strength to weight ratio than conventional grid ribbing structures. The end walls 114 include laterally-extending platforms 124 that extend from one of the side walls 112 to the other one of the side walls 112. A top edge 116 of the box 110 is sized and shaped to receive the pedestal housing 130 (see FIG. 8). The box 110 also includes a pair of vertical supports 118 adjacent the end walls 114 and a horizontal crossbeam 119 that extends in a longitudinal direction from one of the vertical supports 118 to the other one of the vertical supports 118. The horizontal crossbeam 119 is capable of supporting optical fiber network components, as described in more detail below with respect to FIGS. 11-14.

Figure 3:
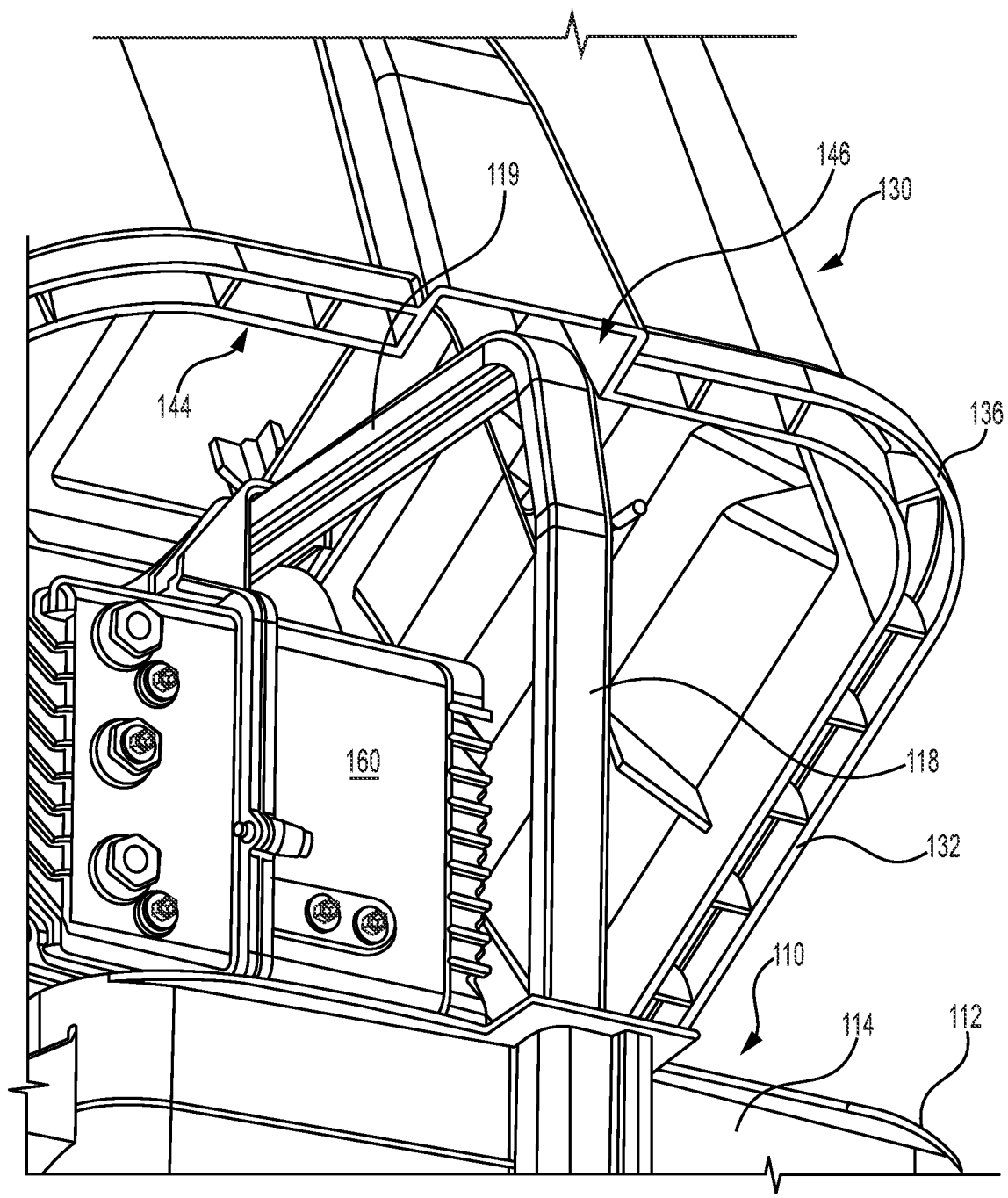
FIG. 3 is a bottom perspective view of the housing of the exemplary node pedestal of FIG. 1.
Figure 4:
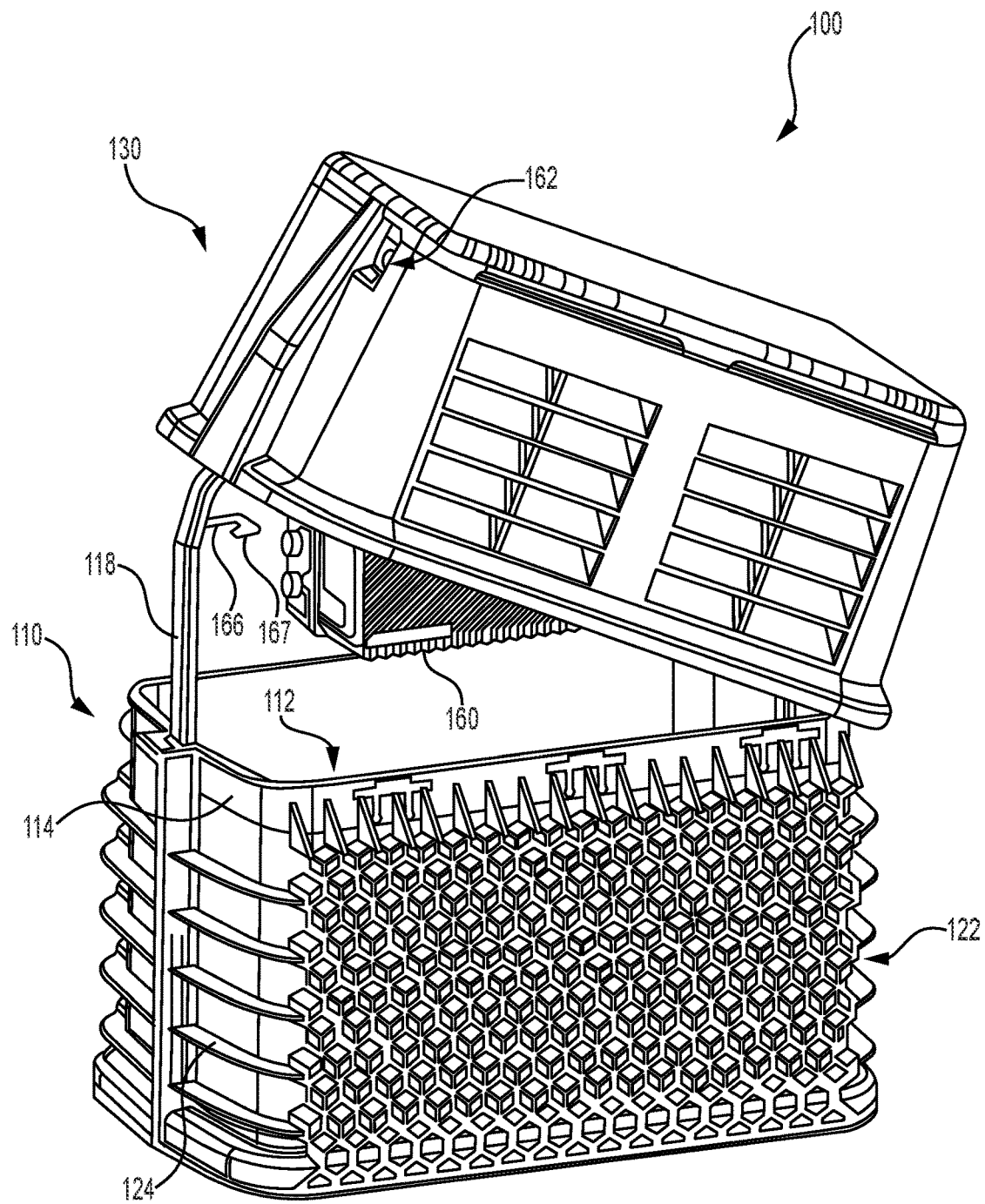
FIG. 4 is a perspective view of the exemplary node pedestal of FIG. 1 in a partially open configuration.

The pedestal housing 130 includes a lower hood 132 and an upper hood 134. The lower hood 132 and the upper hood 134 may be securely coupled to one another. As shown in FIGS. 3 and 4, the lower hood 132 has inner end walls 144 that include tapered grooves 146 that are structured and arranged to align with the vertical supports 118 of the box 110 when the housing 130 is coupled with the box 110. The tapered grooves 146 are wider at a bottom edge 136 of the housing 130 so as to assist with alignment of the housing 130 relative to the vertical supports 118 of the box 110 when coupling the housing 130 with the box 110. The bottom edge 136 has a shingled design such that the bottom edge 136 of the housing 130 is sized and arranged to overlap the top edge 116 of the box 110 when the housing 130 is coupled with the box 110 (see FIG. 8).

Referring to FIGS. 5A-5G, each of the end walls 144 of the lower hood 132 includes a locking mechanism 148, for example, a quarter-turn slam-lock mechanism. When facing each inner end wall 144, the respective locking mechanism 148 may be on the same side of the groove 146 so that the housing 130 can be coupled with the box 110 in two orientations of the housing 130 rotated by 180° relative to the box 110.

Each of the locking mechanisms 148 includes a latch 164 and a catch 166. Each latch 164 is coupled to a respective end wall 114 by a fastener 179 such that the latch 164 is rotatable relative to the end wall 114 about a rotation axis 169 that extends through the fastener 179. The locking mechanism 148 includes a rotating torsion spring 165 operably coupled with the latch 164 and configured to urge the latch 164 in a counter-clockwise direction about the rotation axis 169 to a rest position shown in FIG. 5A. The catches 166 extend inward from the vertical supports 118 toward a middle of the box 110.

The latch 164 includes a first arm portion 174 that extends away from the fastener 179 in a direction perpendicular to the rotation axis 169. A curved shoulder portion 172 of the latch 164 extends from an end of the first arm portion 174 distal from the rotation axis 169. The curved shoulder portion 172 extends from the first arm portion 174 in a counter-clockwise direction relative to the rotation axis 169. The latch 164 includes a second arm portion 168 that extends from an elbow 170 at a second end of the curved shoulder portion 172 that is opposite to a first end of the curved shoulder portion 172 that meets the first arm portion 174. The second arm portion 168 extends from the curved shoulder portion 172 that generally extends away from the fastener 179 in a direction perpendicular to the rotation axis 169.

In some aspects, the inner end wall 144 may be configured to form an angle with respect to a vertical direction relative to the ground where the box 110 is disposed. In such aspects, the inner end wall 144 may include a vertical portion where the latch 166 is coupled with the end wall 144 so as to align the latch 164 relative to the catch 166 in the vertical direction.

The locking mechanism 148 may include a keyed lock 162 accessible from the outside of the end walls 144 (see FIGS. 1, 2, and 4). The lock 162 is operably coupled with the latch 164 and may be keyed based on the service provider such that any technician from a particular service provider can access all node pedestals of that service provider. Alternatively, the lock 162 may be varied to restrict access to the node pedestal to certain authorized technicians.

Figure 5A:
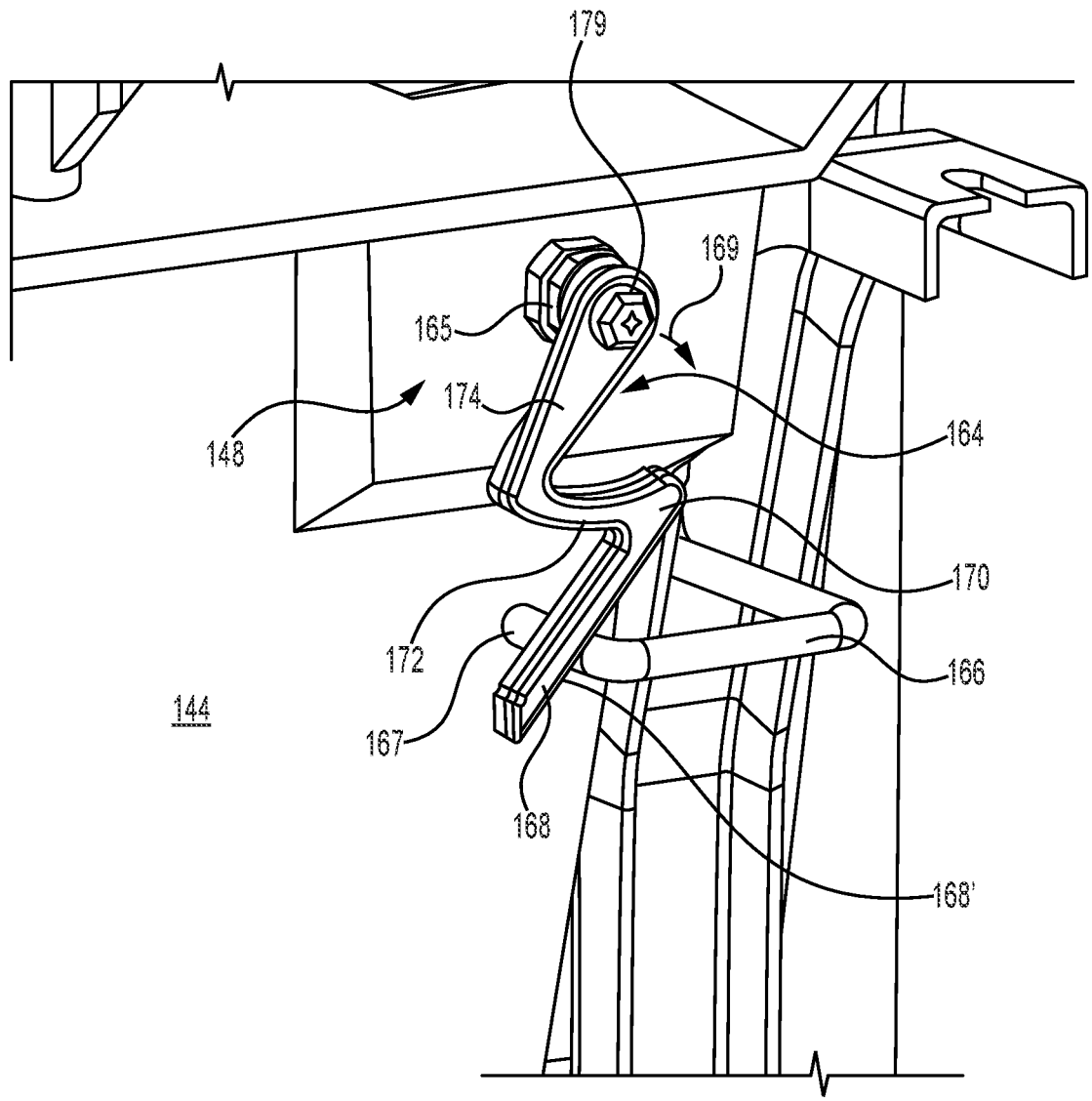
FIGS. 5A-5E are perspective view of an exemplary locking mechanism of the exemplary pedestal of FIG. 1.
Figure 5B:
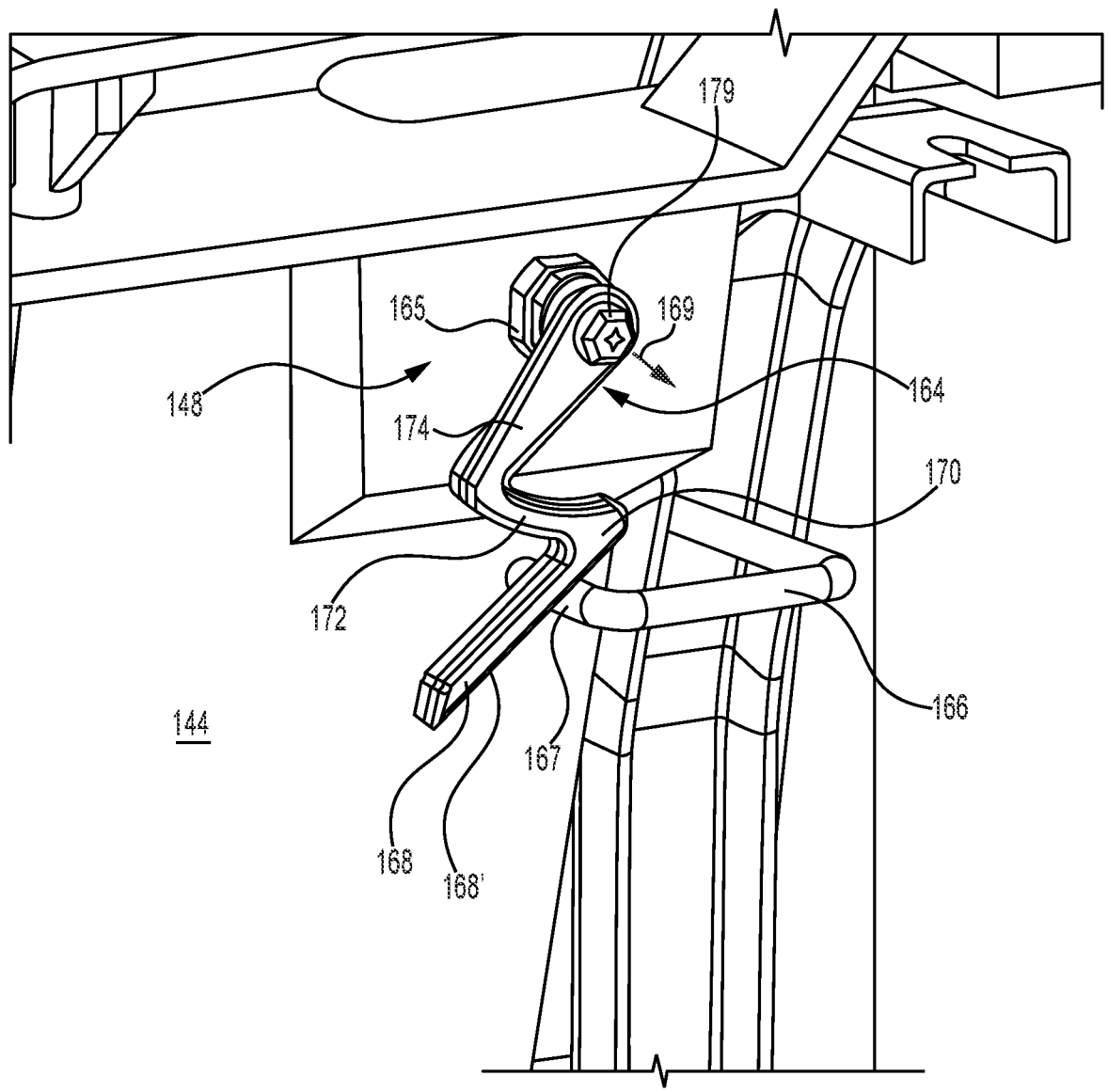
Figure 5C:
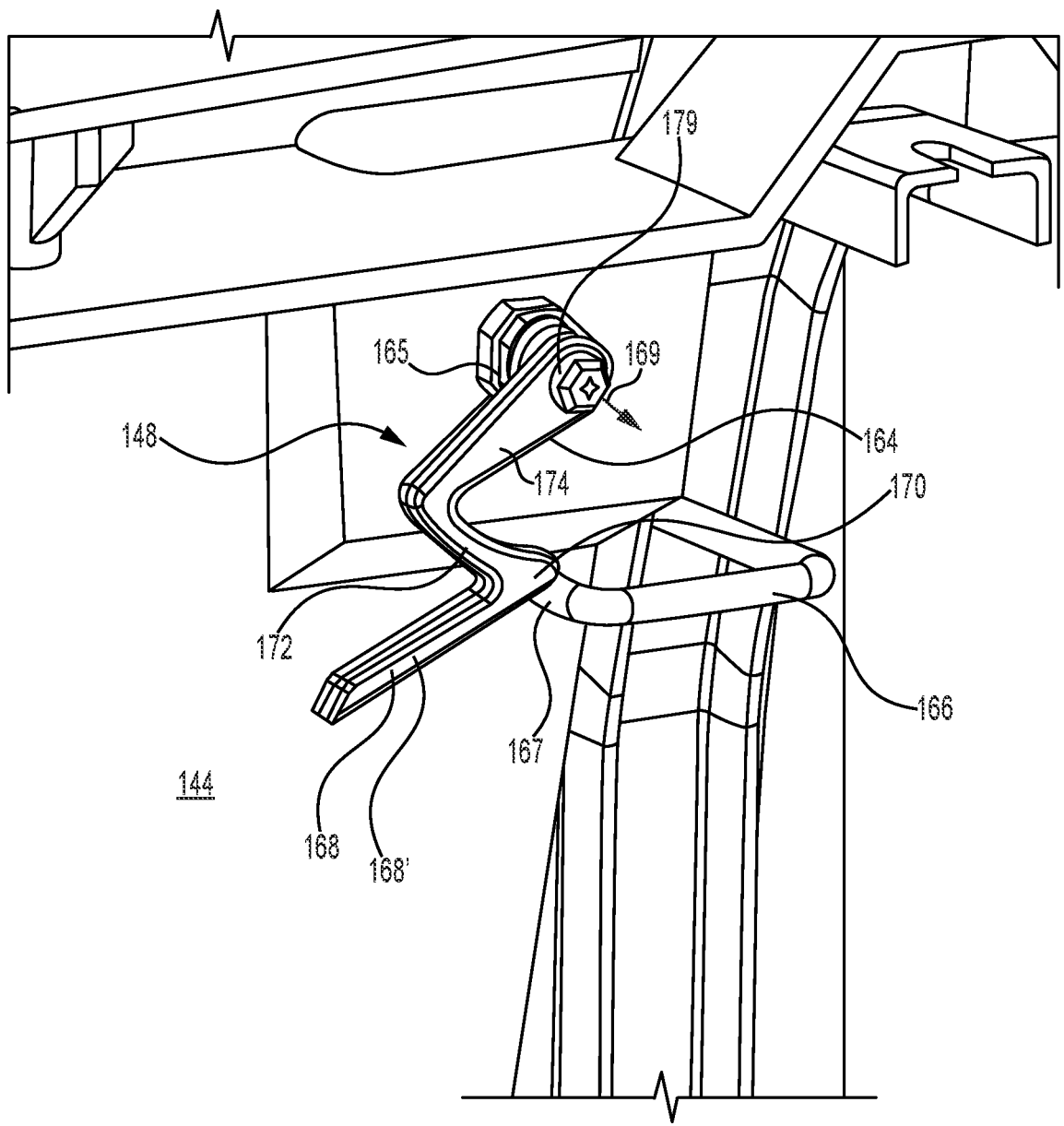
Figure 5D:
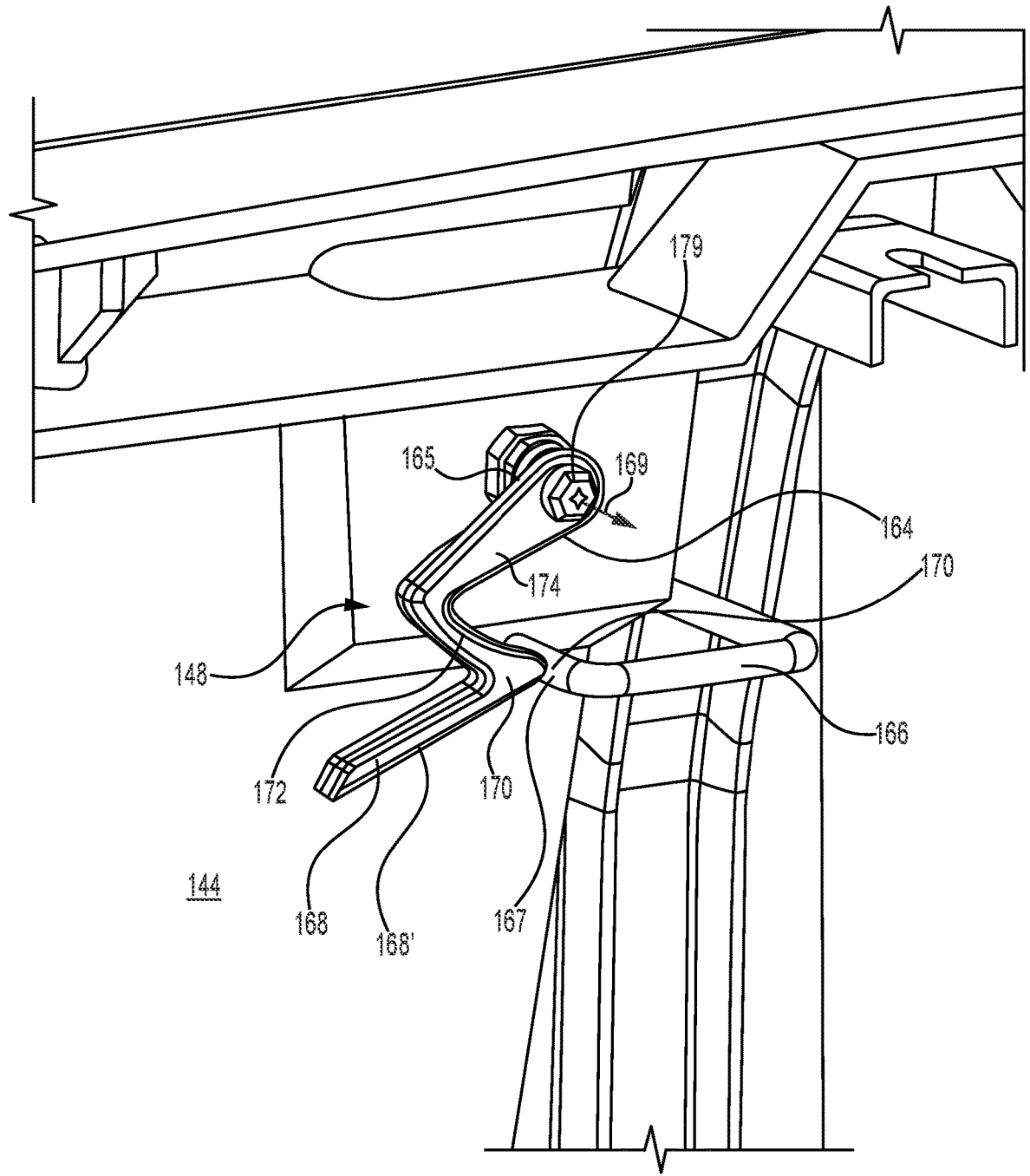
Figure 5E:
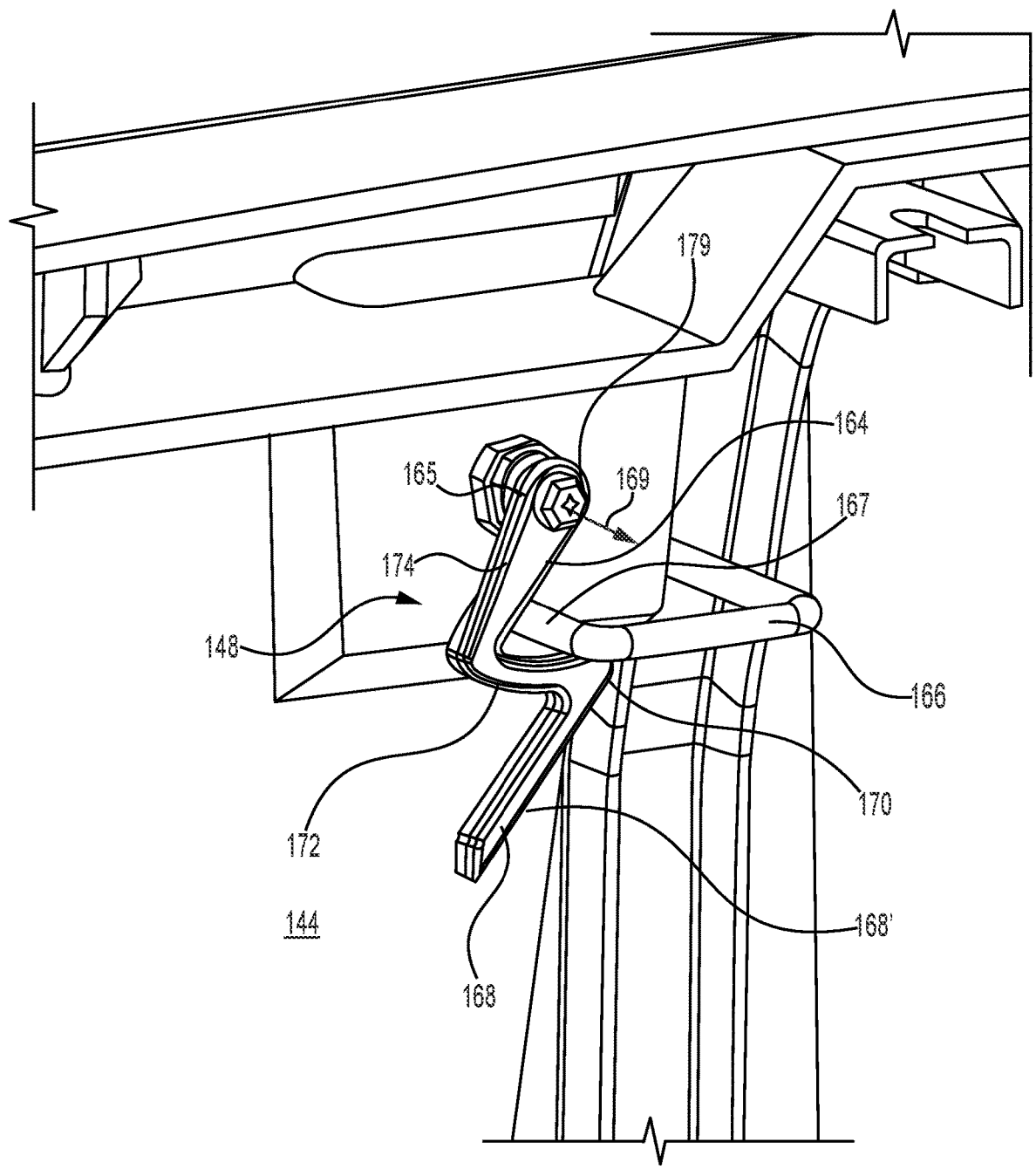
Figure 6:
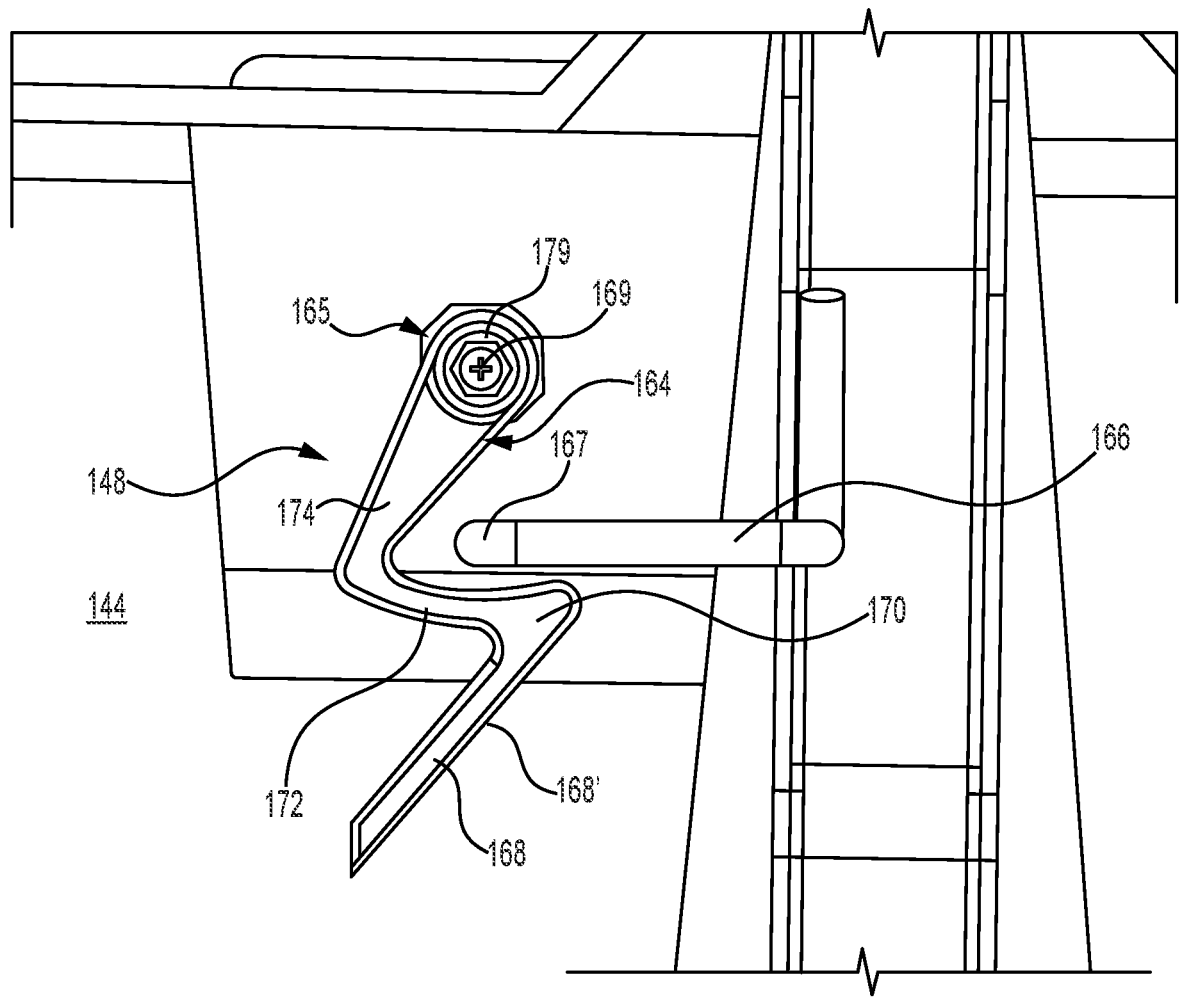
FIGS. 6A-6E are perspective views of the housing being pivoted relative to the box of the exemplary pedestal of FIG. 1.
Figure 6A:
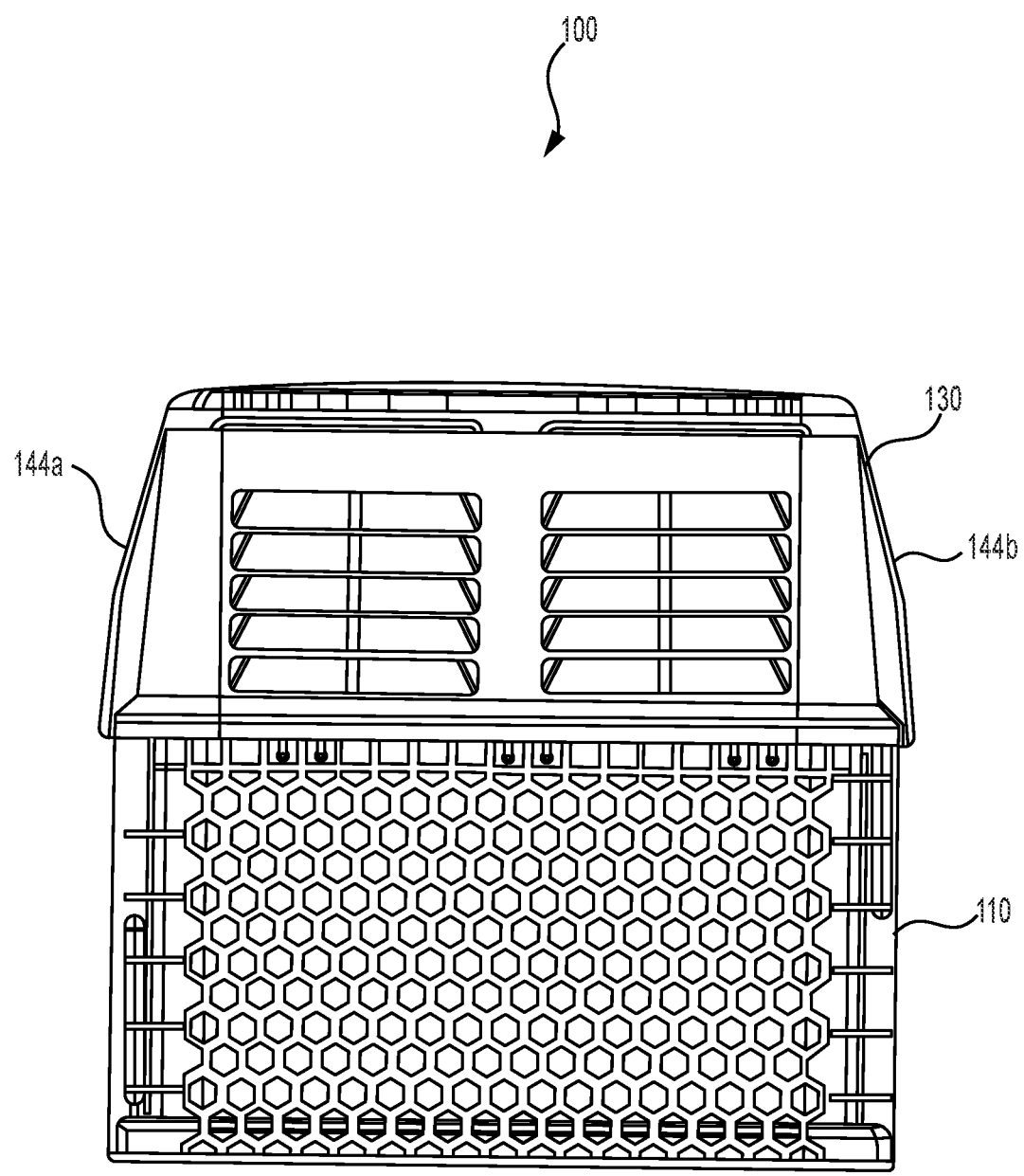
Figure 6B:
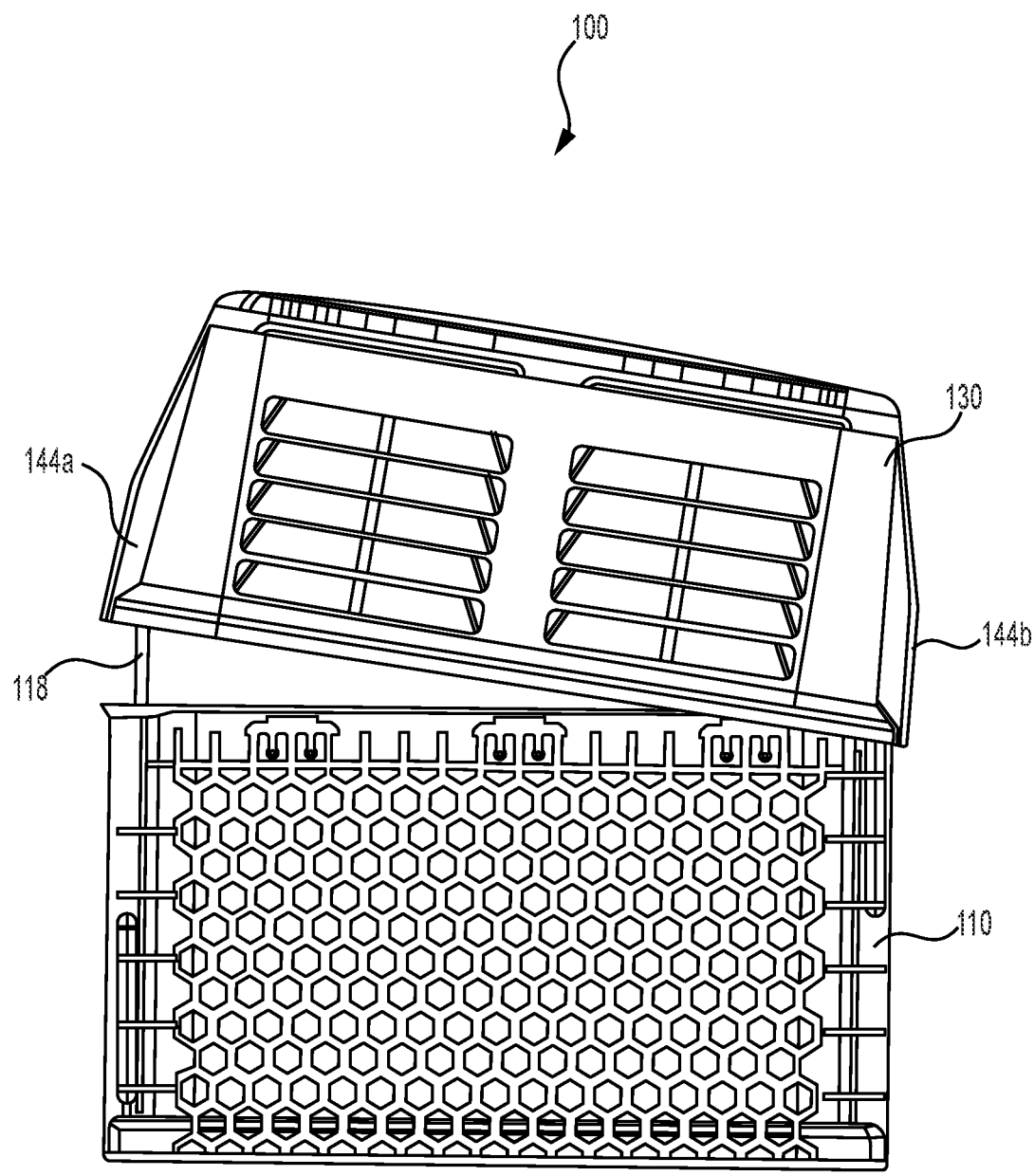
Figure 6C:
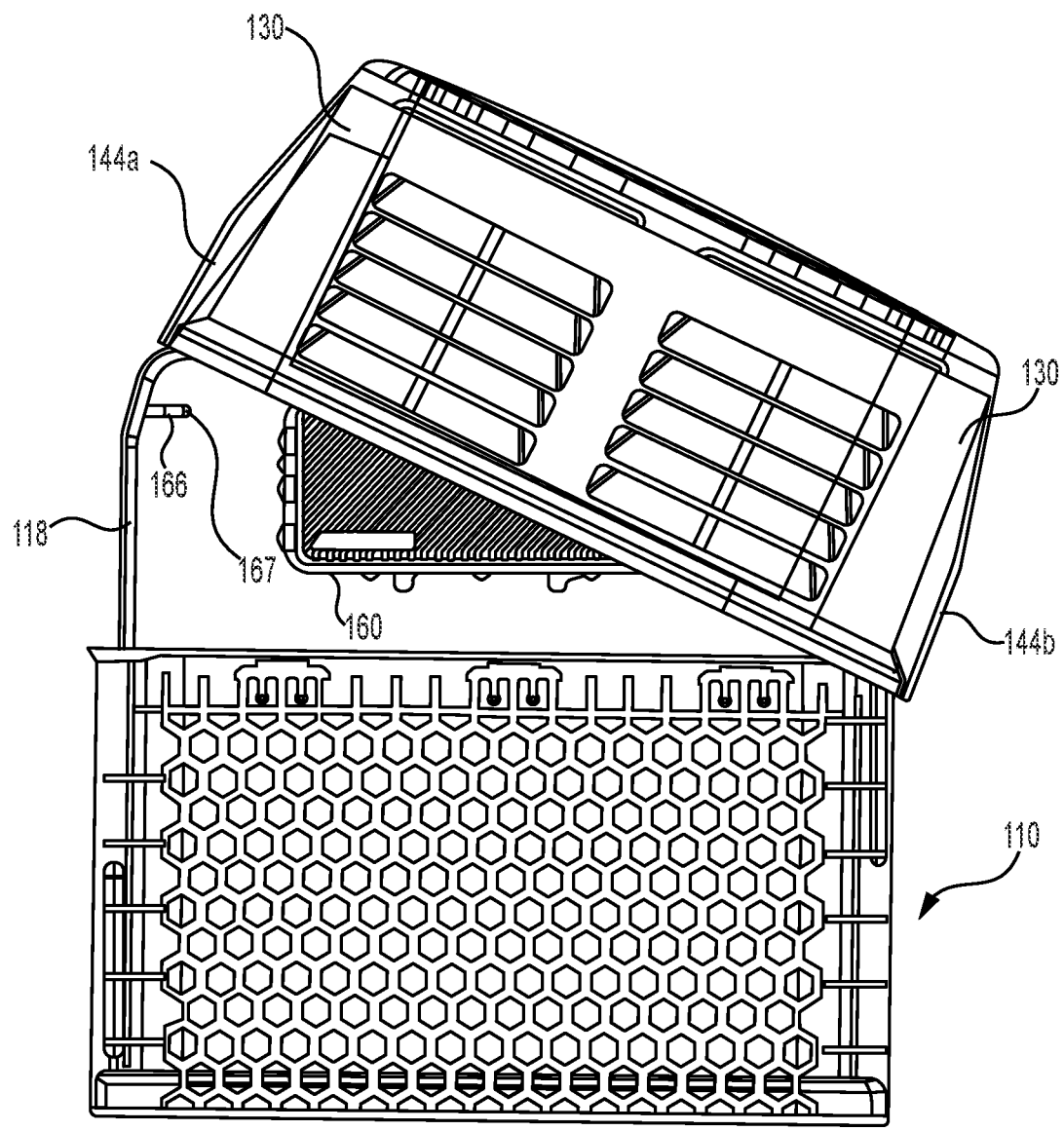
Figure 6D:
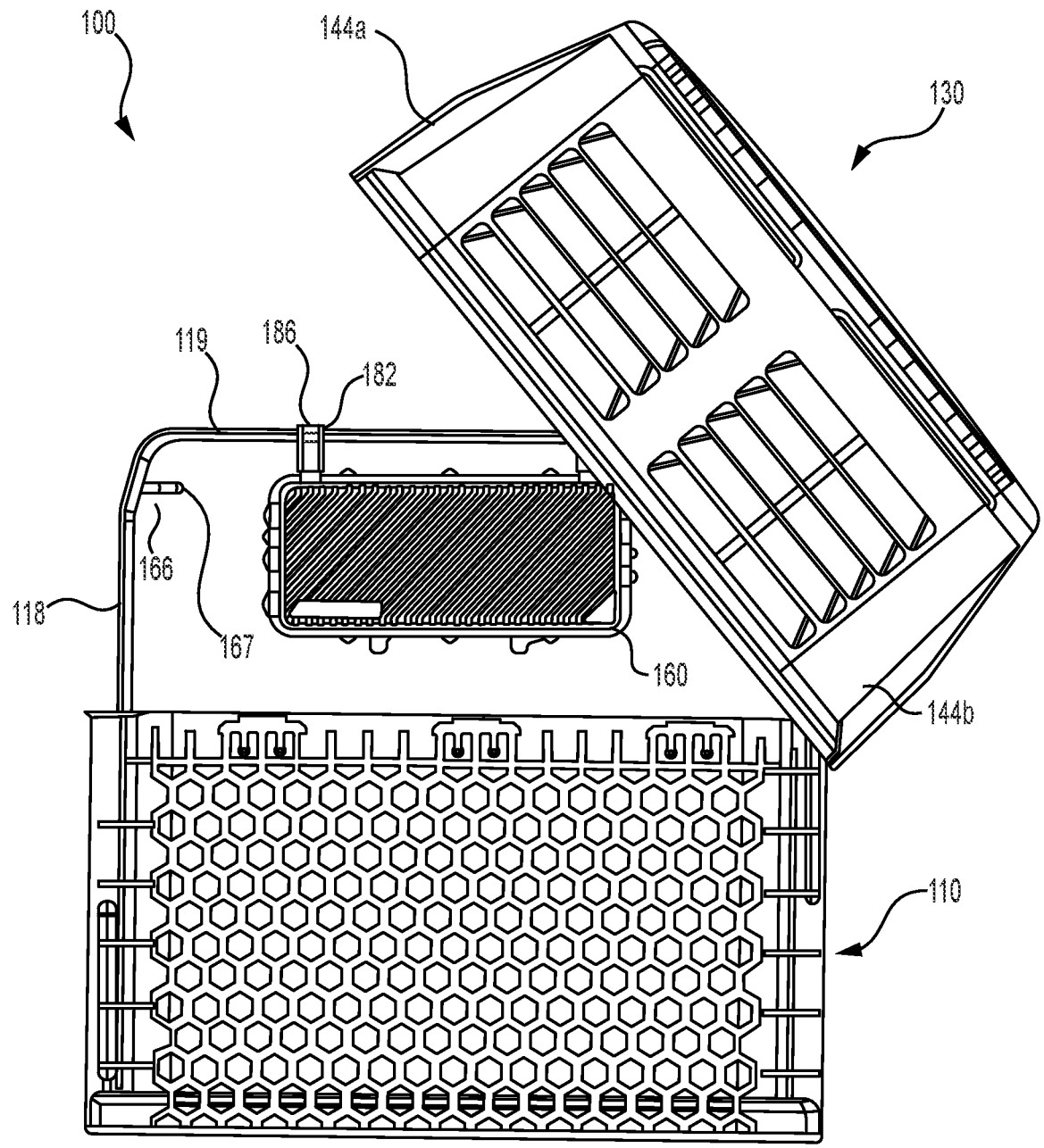
Figure 6E:
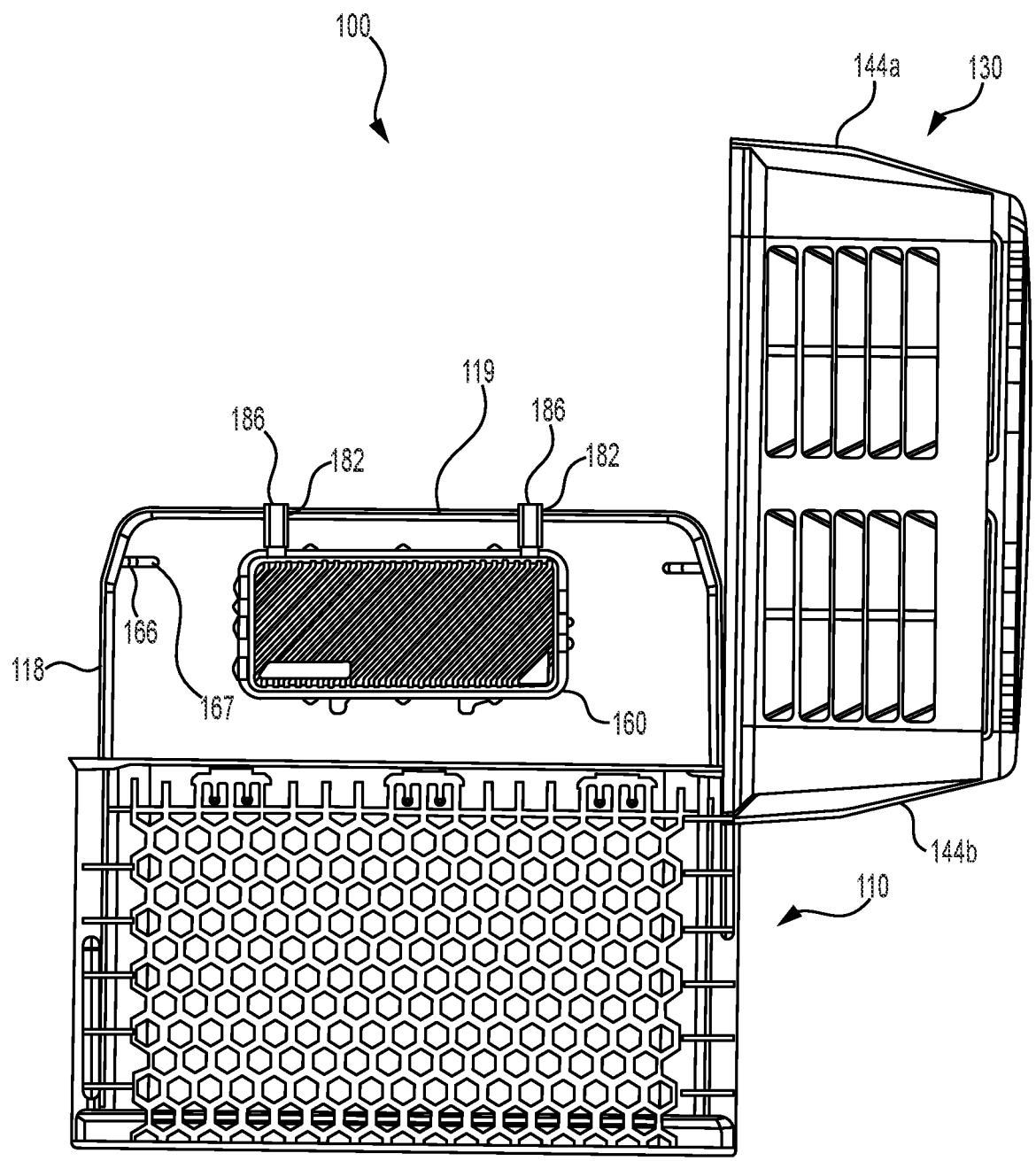
Figure 7A:
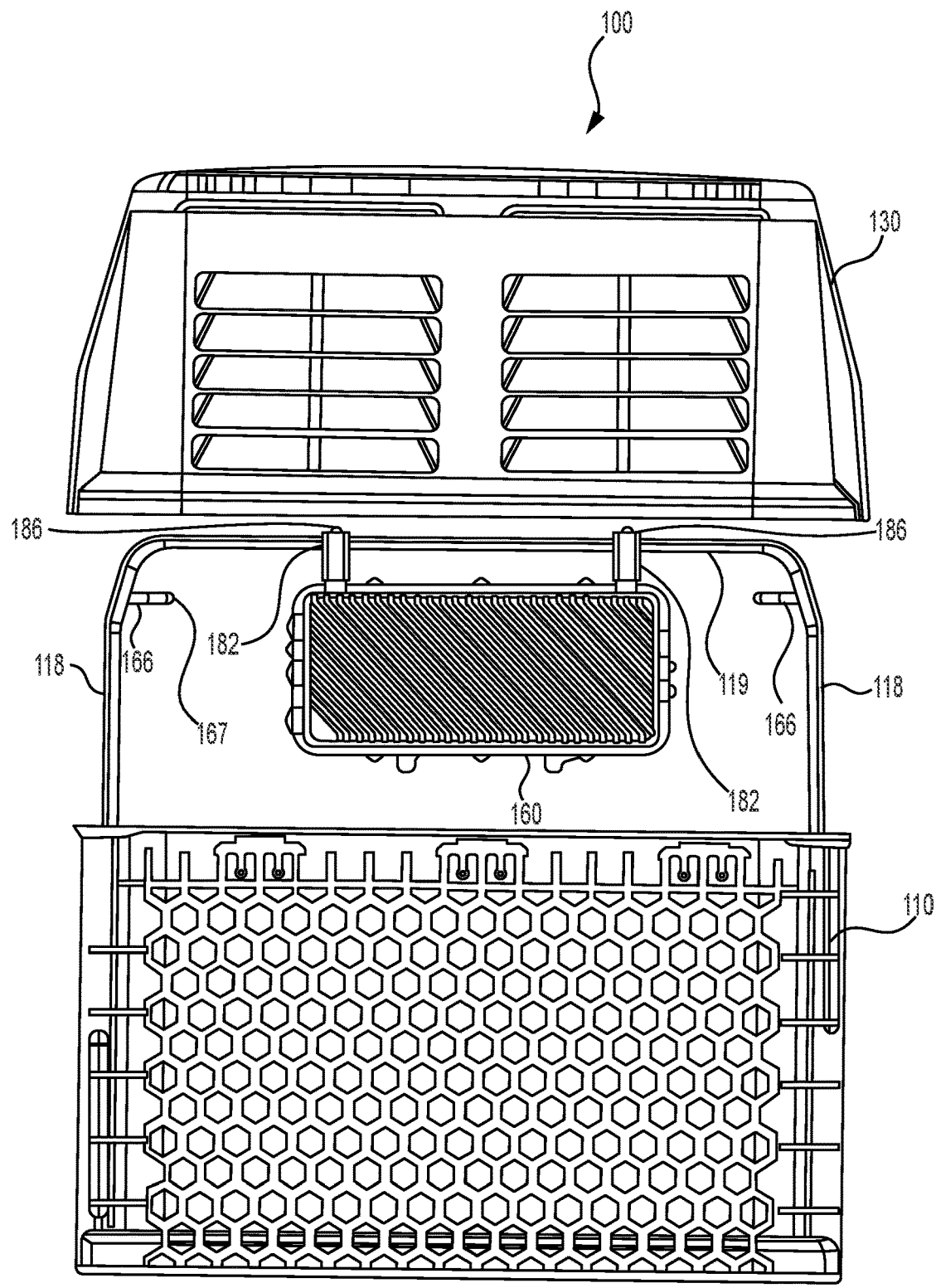
FIGS. 7A-7D are perspective views of the housing being coupled with and removed from the box of the exemplary pedestal of FIG. 1.
Figure 7B:
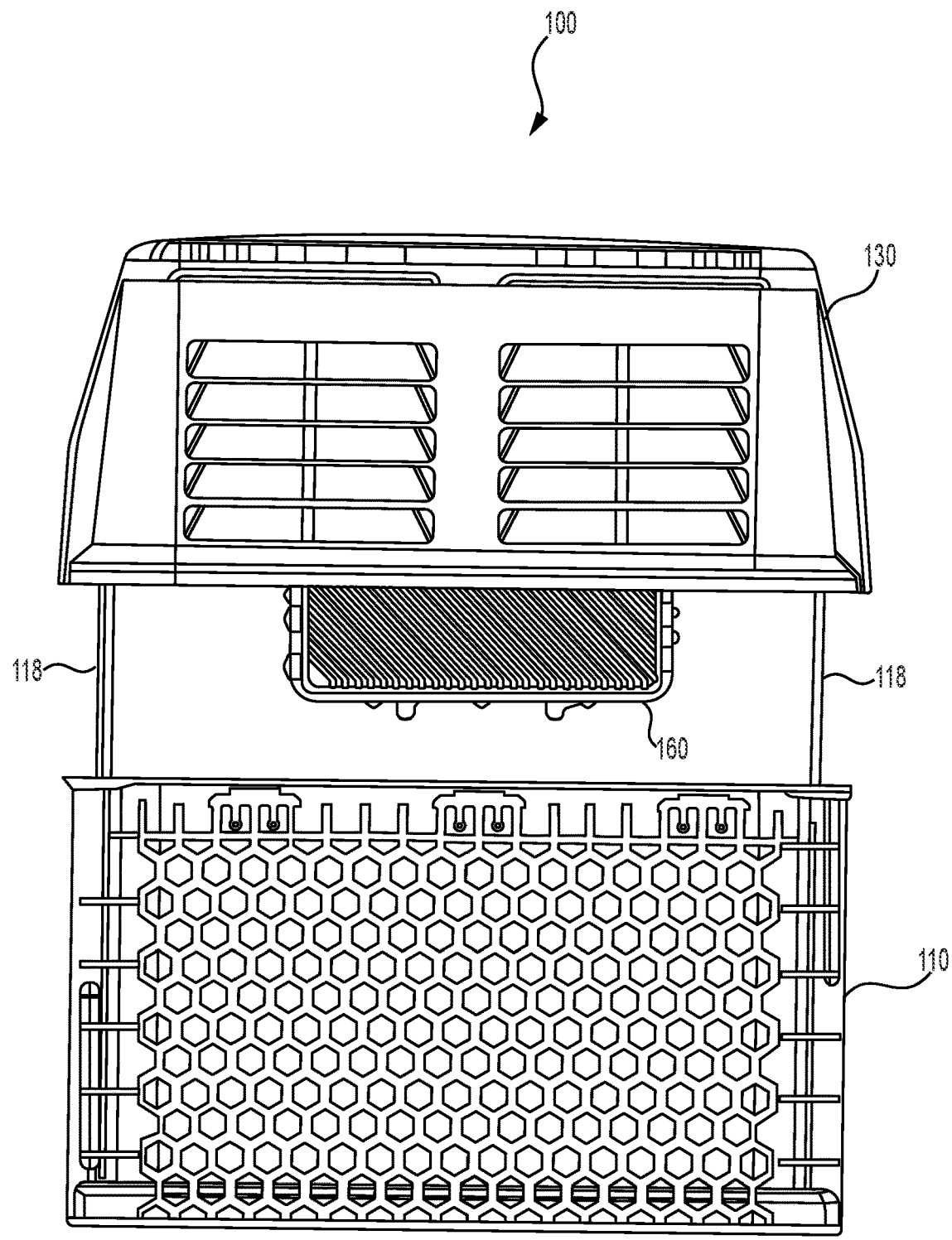
Figure 7C:
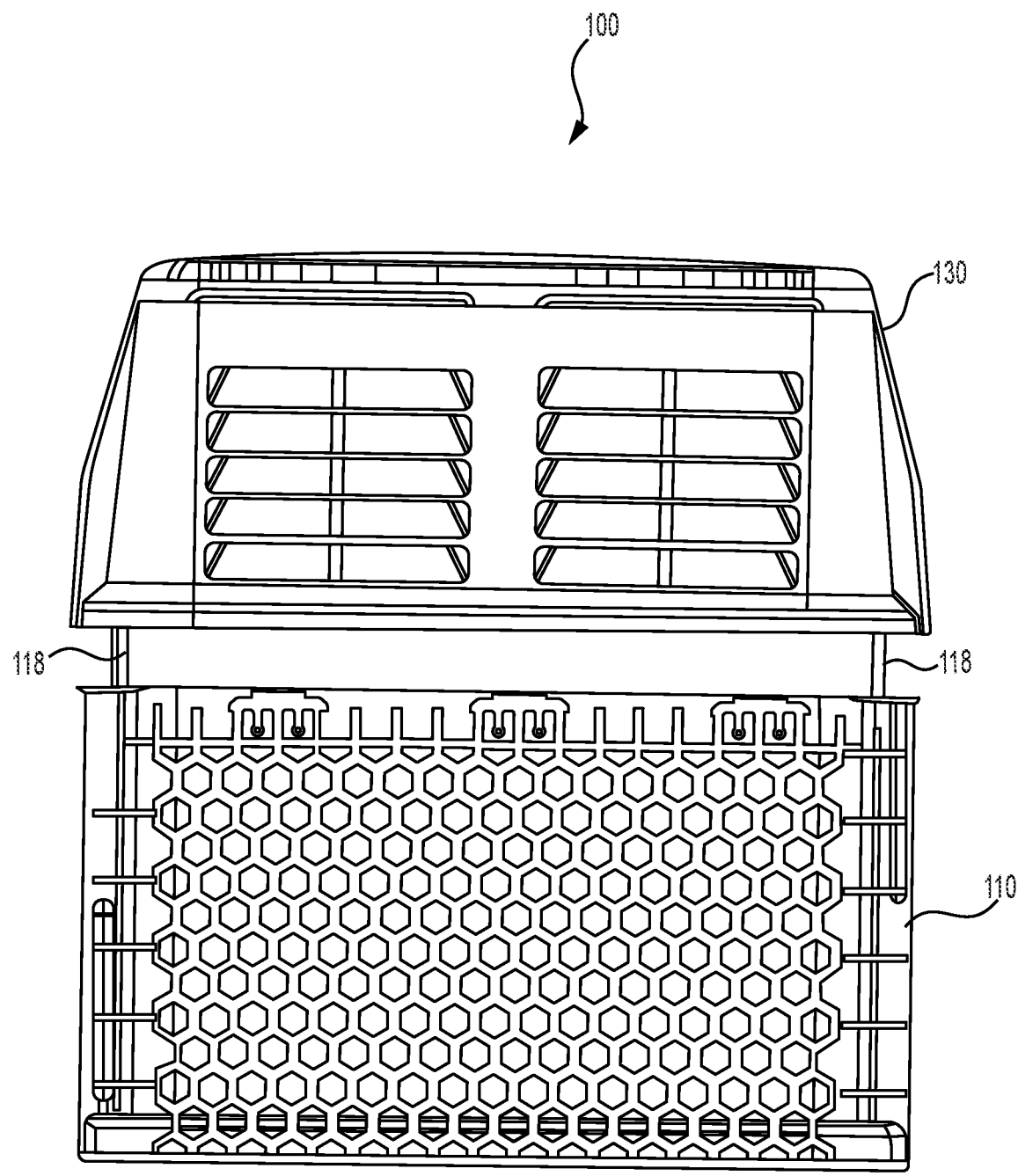
Figure 7D:
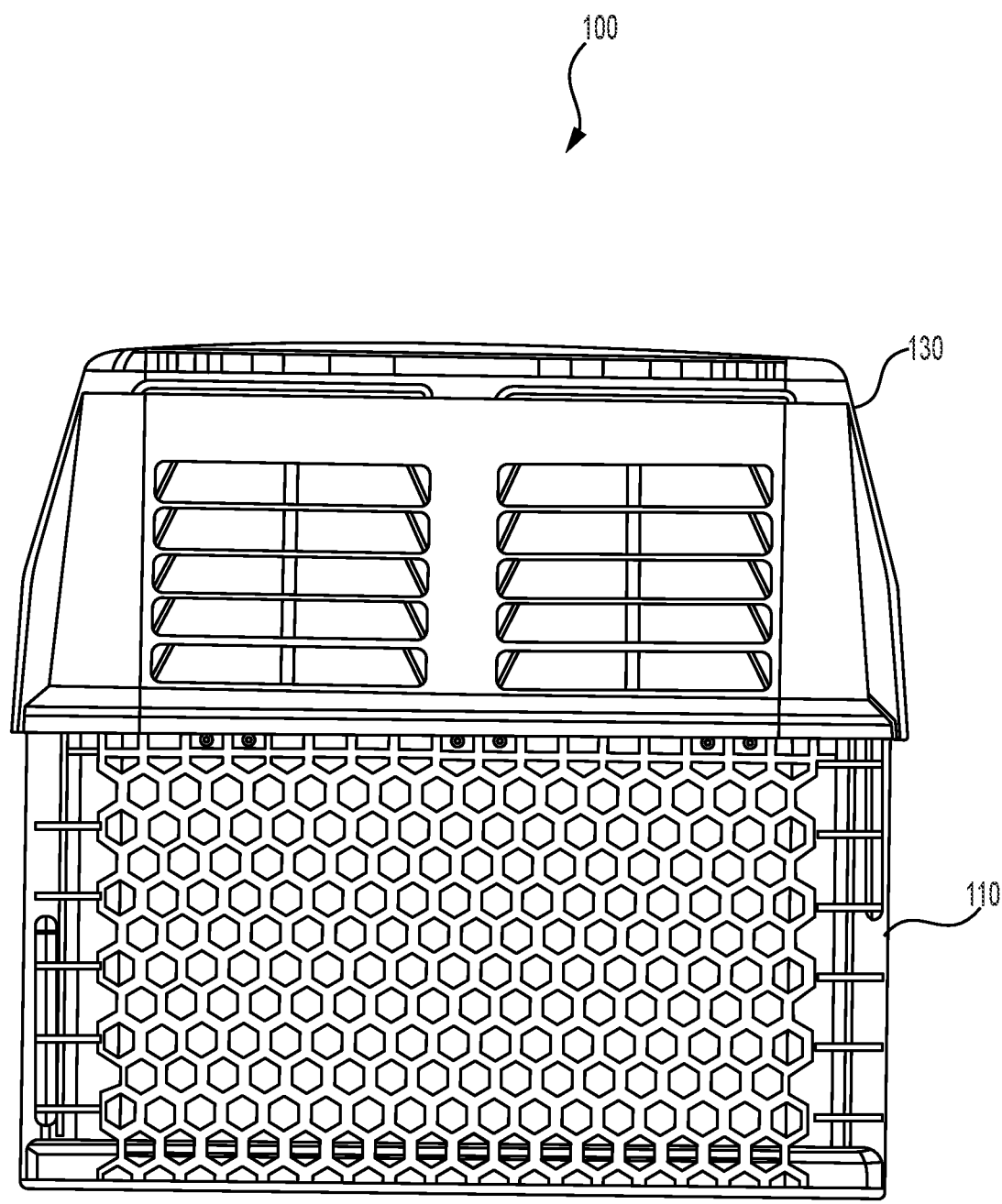

As shown in FIG. 5A, in an open configuration of the housing 130 relative to the box 110, prior to the housing 130 being attached to the box 110, a distal arm 168 of the latch 164 is disposed above an arm 167 of the catch 166. As the housing 130 is pushed downward toward the box 110, an engagement surface 168' of the distal arm 168 engages the catch 166, and the catch 166 urges the distal arm 168 in a clockwise direction until the elbow 170 of the latch 164 engages the catch 166, as shown in FIGS. 5B-5D. As the housing 130 is pushed further downward toward the box 110, the elbow 170 moves in the clockwise direction beyond the arm 167 of the catch 166 such that the elbow 170 can be moved past the catch 166 (e.g., below the catch 166 when the housing is moved downward in a vertical direction). After the elbow 170 is moved past the arm 167 of the catch 167, the torsion spring 165 urges the latch 164 back in the counter-clockwise direction to the rest position shown in FIGS. 5E and 5F, which now also functions as a latched position. When the latch 164 is in the position relative to the catch 166 illustrated in FIGS. 5E and 5F, the shoulder portion 172 of the latch 164 is disposed below the catch 166 and the torsion spring 165 prevents the latch 164 from being pivoted in the clockwise direction relative to the catch 166 such that the latch 164 is configured to engage the catch 166 to prevent the housing 130 from being removed from the box 110. In order for the latch 164 to be removed from the catch 166, and thus for the housing 130 to be removed from the box 110, a technician can insert a key (not shown) into the lock 162 to turn the latch 164 clockwise, for example, by a quarter-turn.

As will be described in more detail below with, the pedestal 100 according to the present disclosure permits the housing 130 to be removed from the box 110 by unlatching one of the locking mechanisms 148 and pivoting the housing 130 relative to the box 110 or by unlatching both of the locking mechanisms, which may require a second technician, and lifting the housing 130 vertically relative to the box 110. As described in more detail below, when unlatching the locking mechanism 148 at one of the end walls 144a and pivoting the housing 130 relative to the box 110, the latch 164 of the locking mechanism 148 at the opposite one of the end walls 144b moves outward away from the middle of the box 110 until the latch 164 is no longer disposed beneath the catch 166 so that the housing 130 can be removed from the box 110.

Providing the locking mechanism 148 on both end walls 144 and on opposite sides of the tapered grooves 146 permits installation of the housing 130 on the box 110 in either of two 180° rotated orientations. Also, only one of the quarter-turn slam-lock mechanisms 148 needs to be operated to open the pedestal 100 for access to an interior 102 of the pedestal 100 by pivoting the housing 130 relative to the box 110 about the quarter-turn slam-lock mechanism 148 that is not operated. For example, the quarter-turn slam-lock mechanism 148 can be rotated by a quarter-turn to allow the housing 130 to be lifted from one of the end walls 144 to pivot the housing 130 relative to the box 110, as shown in FIGS. 6A-6E. Similarly, the pedestal 100 can be closed by pivoting the housing 130 relative to the box 110 from one of the end walls 144 in a reverse direction, starting with the configuration shown in FIG. 6E, where the latch 164 of one of the locking mechanisms 148 is coupled with one of the catches 166, and proceeding to the configuration shown in FIG. 6A, where the latch 164 of the second of the locking mechanisms 148 is coupled with the other one of the catches 166.

Figure 15A:
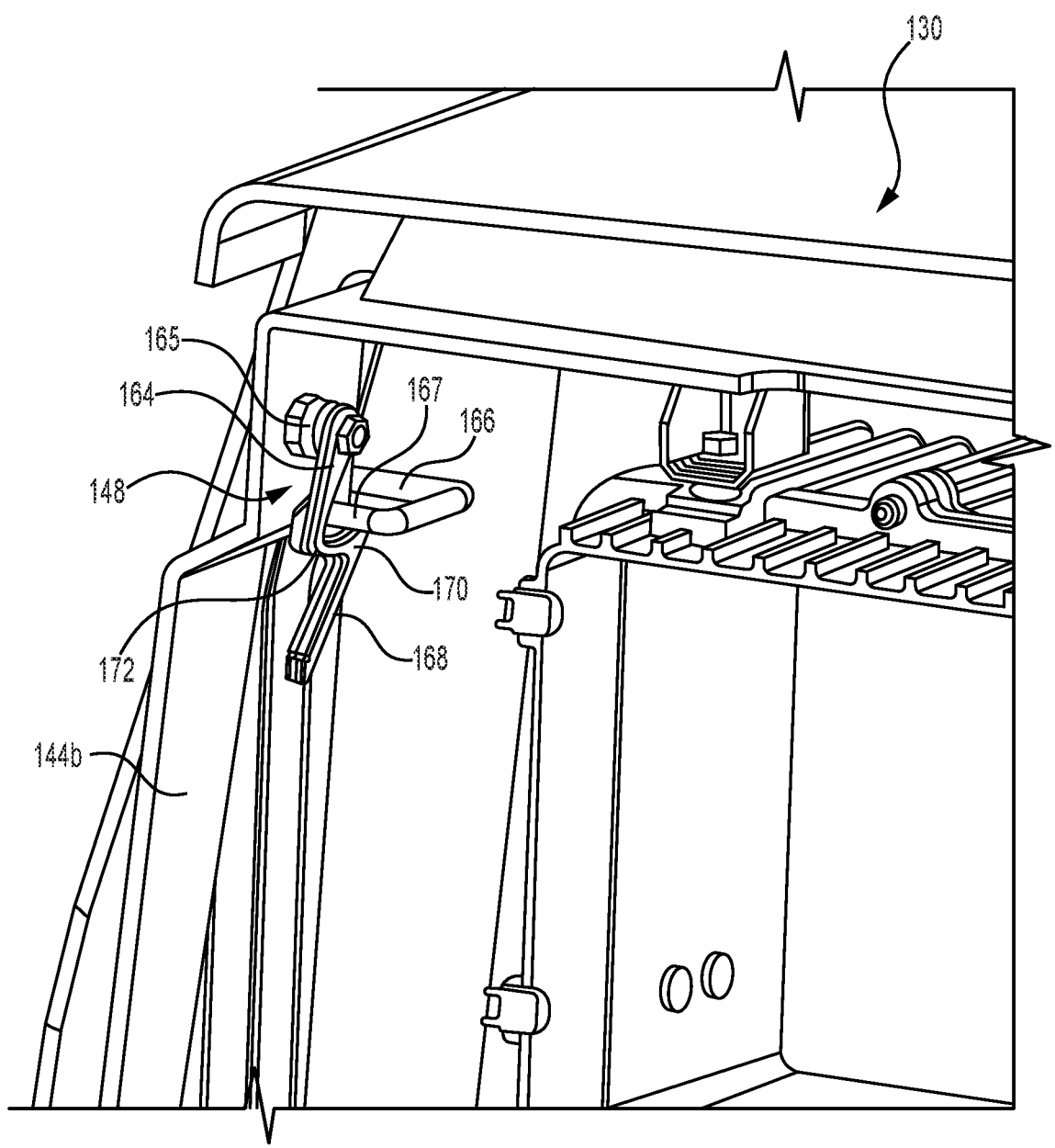
FIGS. 15A-15C are perspective cross-sectional views that illustrate the locking mechanism as the housing is being pivoted relative to the box of the exemplary pedestal of FIG. 1 from the position shown in FIG. 6A to the position shown in FIG. 6B.
Figure 15B:
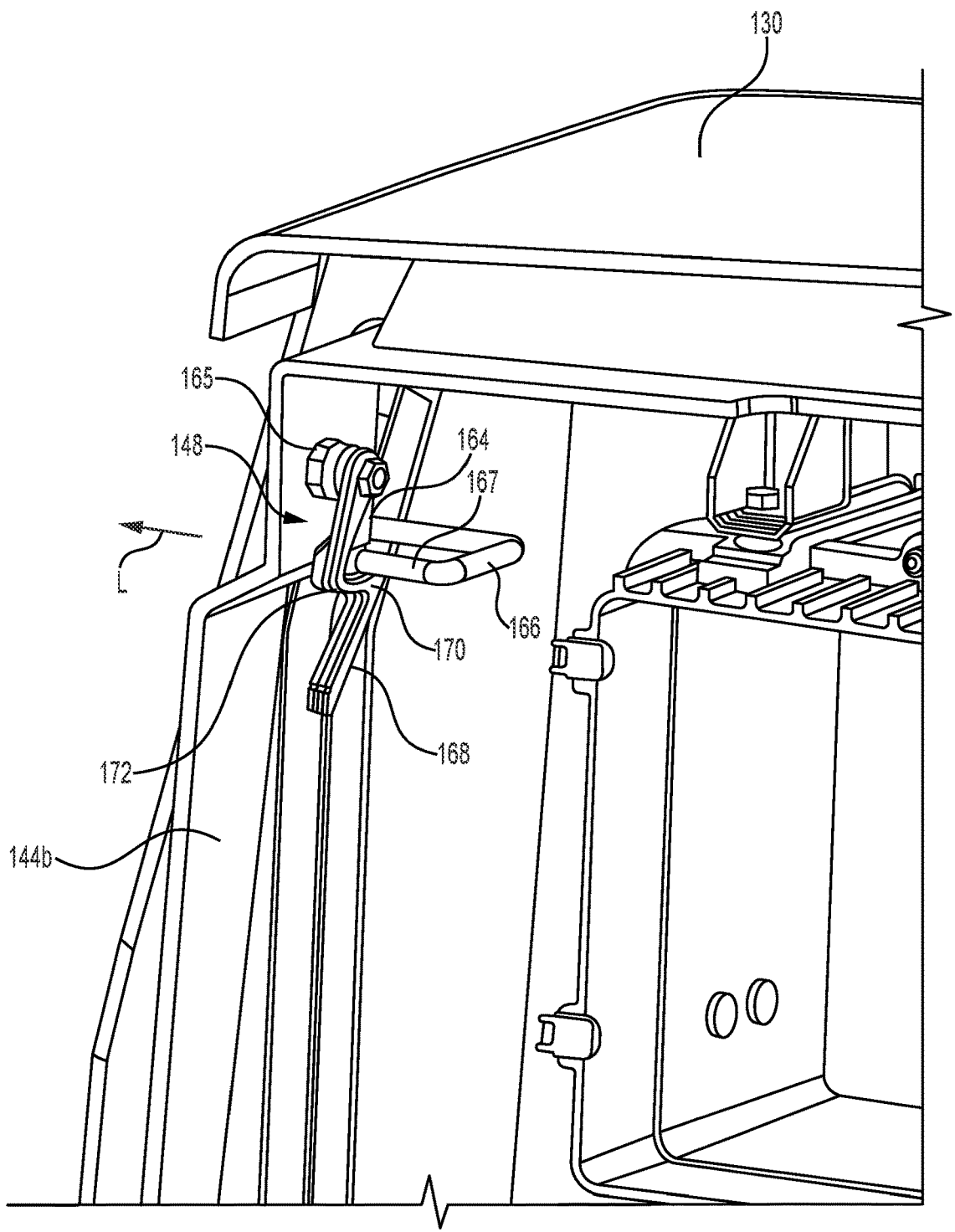
Figure 15C:
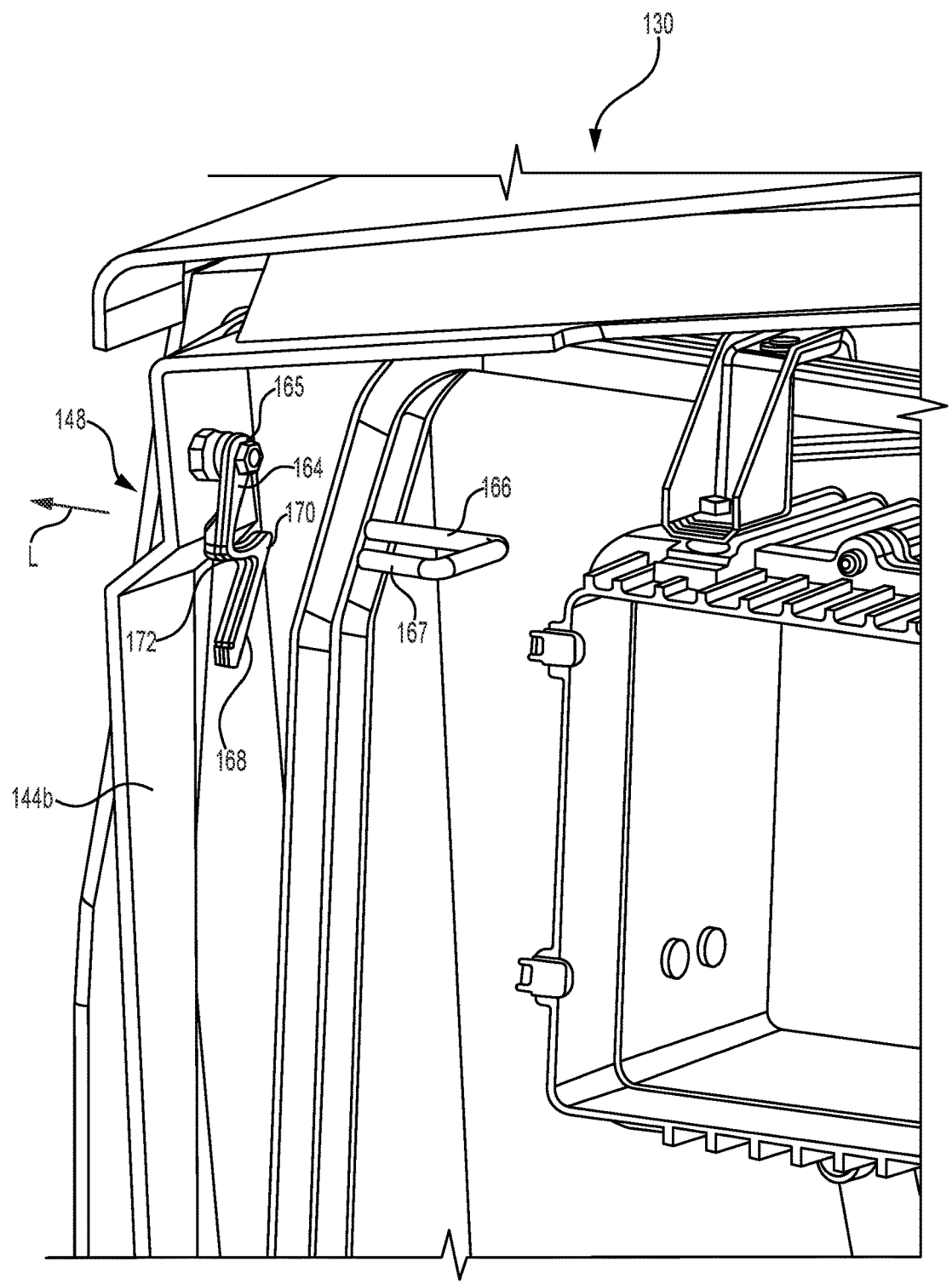
Figure 16:
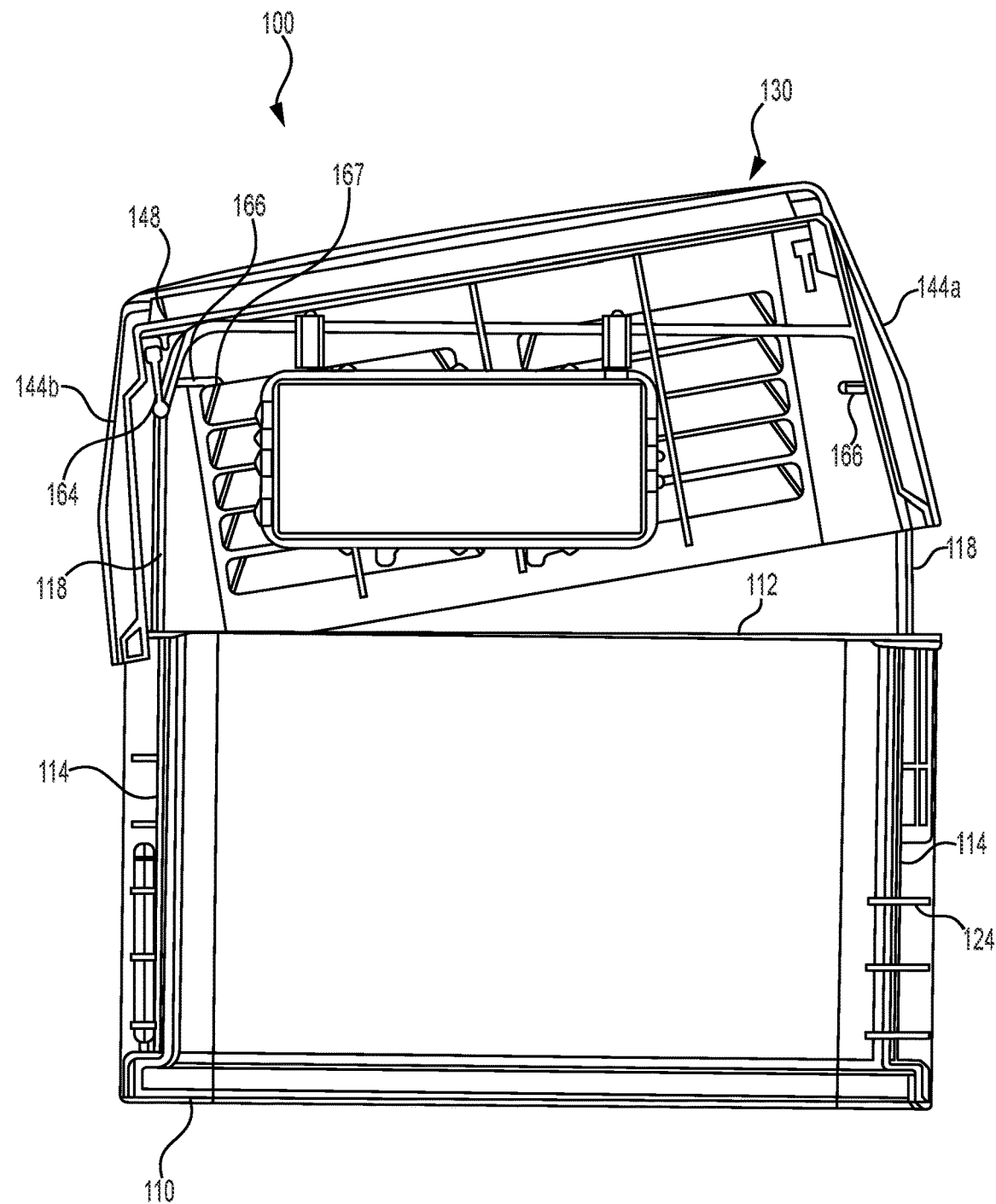
FIG. 16 is a side cross-sectional view that illustrates the locking mechanism when the housing is pivoted relative to the box of the exemplary pedestal of FIG. 1 to the position shown in FIG. 6B.

Referring now to FIGS. 15A-15C, a technician can remove the housing 130 from the box 110 by first unlatching the locking mechanism 148 at one of the end walls 144a and pivoting the housing 130 relative to the box 110 about an axis that extends transverse to the longitudinal direction near the bottom of the housing. In the closed position of the pedestal shown in FIG. 6A and the latched position of the locking mechanisms 148, the shoulders 172 of the latches 164 may be spaced from a bottom of the catch 166 in the vertical direction, as shown in FIG. 5F, so that the latch 164 of the locking mechanism 148 at the opposite one of the end walls 144b can begin to pivot relative to the catch 166 as the unlatched locking mechanism 148 at the end wall 144a begins to pivot. As the end wall 144a pivots upwardly away from the box 110, the latch 164 of the locking mechanism 148 at the opposite one of the end walls 144b moves outwardly relative to the catch 166 in a direction L away from the middle of the box 110, as shown in FIG. 15B. After the housing 130 is pivoted by a predetermined angle or greater relative to the box 110, the latch 164 is no longer disposed beneath the catch 166, as shown in FIGS. 15C and 16, so that the end wall 144b of the housing 130 can be removed from the box 110.

Alternatively, the pedestal 100 can be opened and closed by moving the housing 130 in an upward and downward direction relative to the box 110, as shown in FIGS. 7A-7D. As discussed above, removing the housing 130 by vertical movement relative to the box 110 requires both of the locking mechanism 148 to be unlocked, which may require two technicians. Closing the housing 130 by moving the housing 130 vertically relative to the box 110 causes both of the locking mechanisms 148 to be latched at similar timing.

Figure 8:
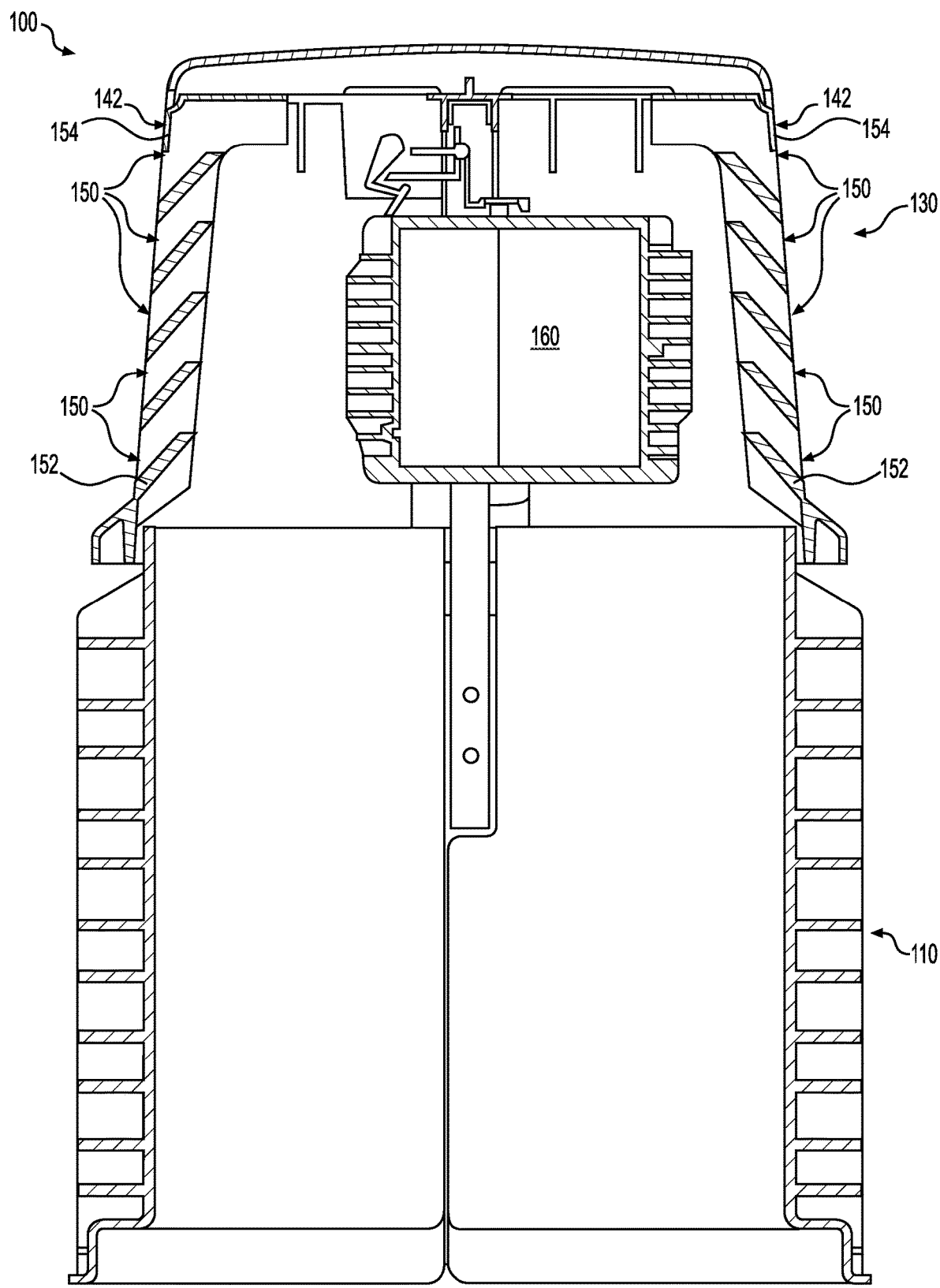
FIG. 8 is an end cross-sectional view of the exemplary pedestal of FIG. 1.

Referring now to FIG. 8, the lower hood 132 includes side walls 142 having openings 150 that allow air to flow into the housing 110 to dissipate heat generated by an electrical component 160, for example, a node, enclosed in the pedestal 100. According to various aspects, the electrical component may comprise an HFC node, a fiber node, a splitter, an amplifier, or the like. The side walls 142 include vanes 152 that define the opening 150. Rather than extending from the side walls 142 of the housing 130 like awnings, the vanes 152 extend inward from an outer surface 154 of the lower hood 132 such that when airflow hits the vanes 152, the airflow is already inside the housing 130, and the airflow is further directed into the interior 102 of the housing 130 rather than be deflected outward from the housing.

Figure 9:
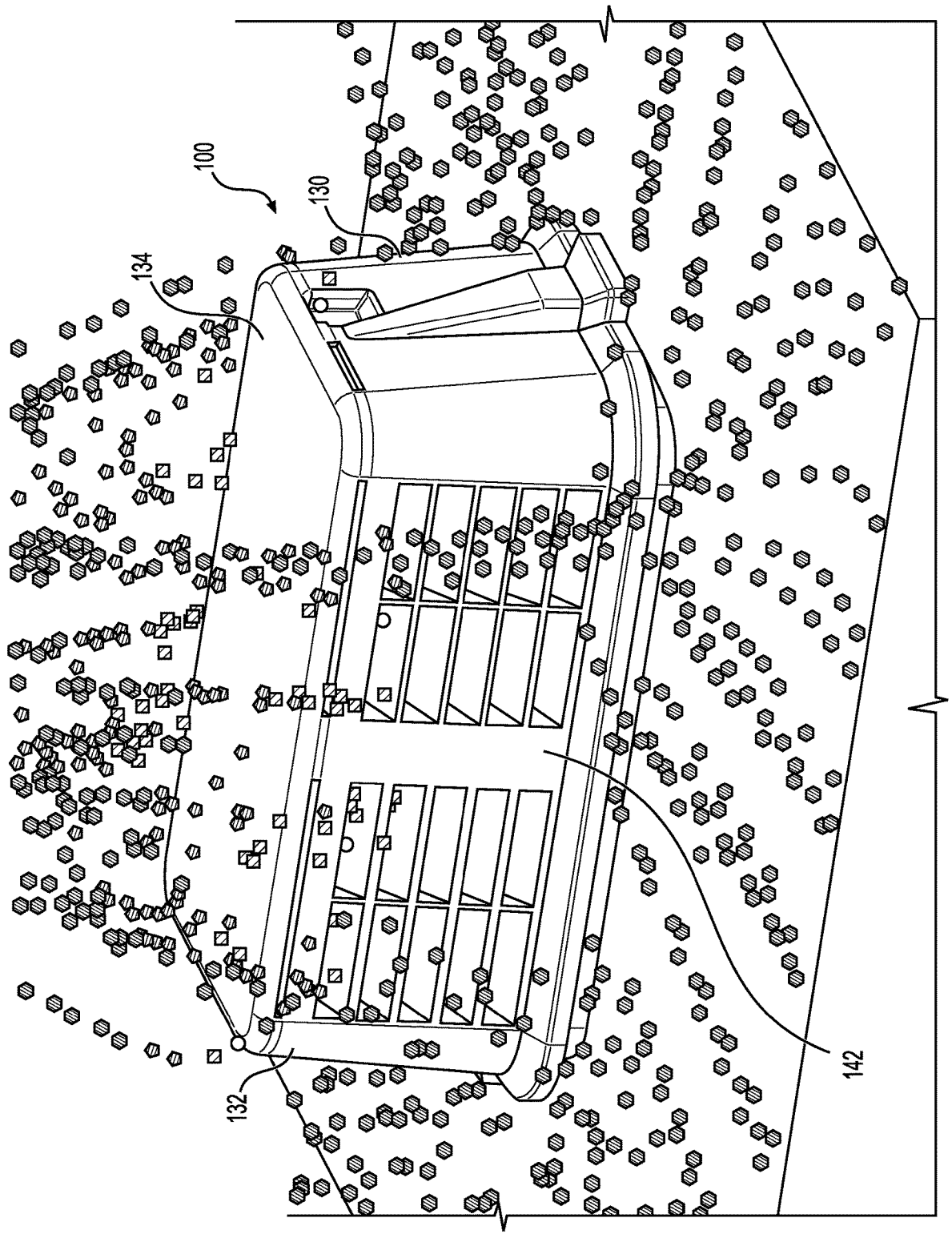
FIGS. 9 and 10 illustrate airflow and heat dissipation of the exemplary pedestal of FIG. 1.
Figure 10:
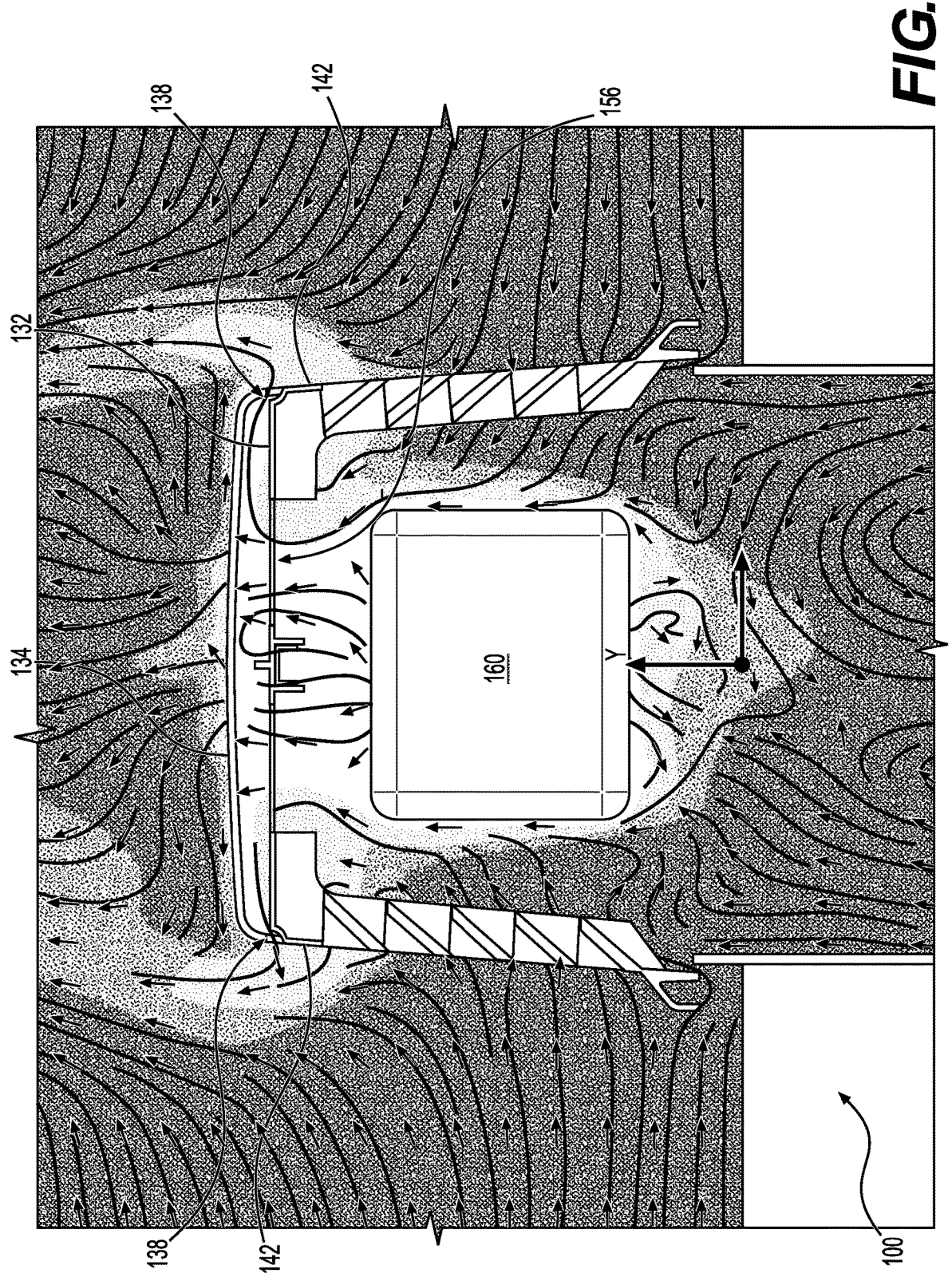
Figure 11:
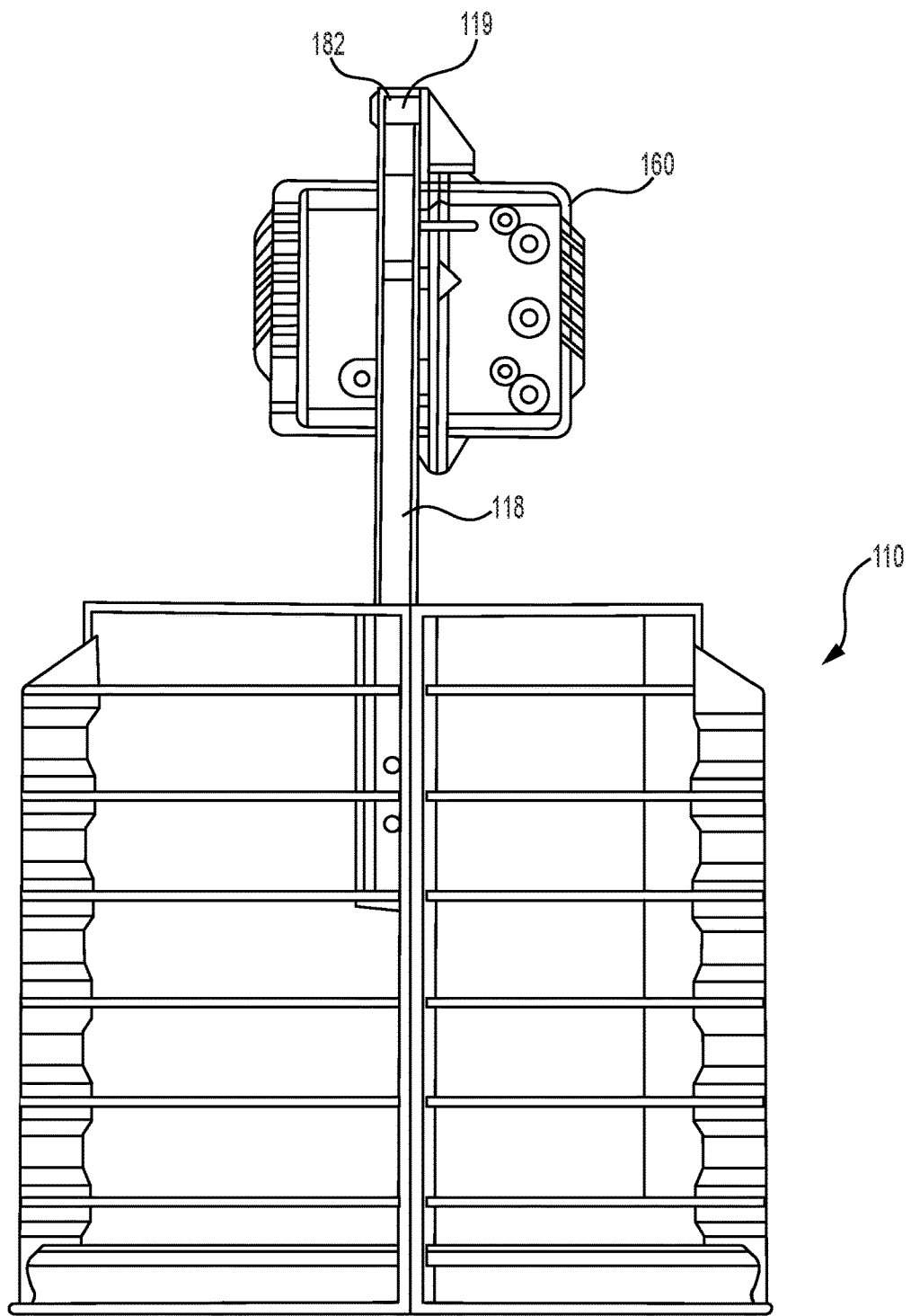
FIGS. 11 and 12 are a side view and a top view, respectively, of the interior of the exemplary node pedestal of FIG. 1 with the housing removed.

FIGS. 9 and 10 illustrate the flow of air through the pedestal 100. As shown, the air flows into the housing 130 from one or both side walls 142. Heat from the electrical component(s) 160 is dissipated by rising with airflow through an opening 156 in the lower hood 132 into the upper hood 134. The heated airflow is then directed laterally by the upper hood 134 to a peripheral opening 138 between the upper hood 134 and the lower hood 132.

Figure 12:
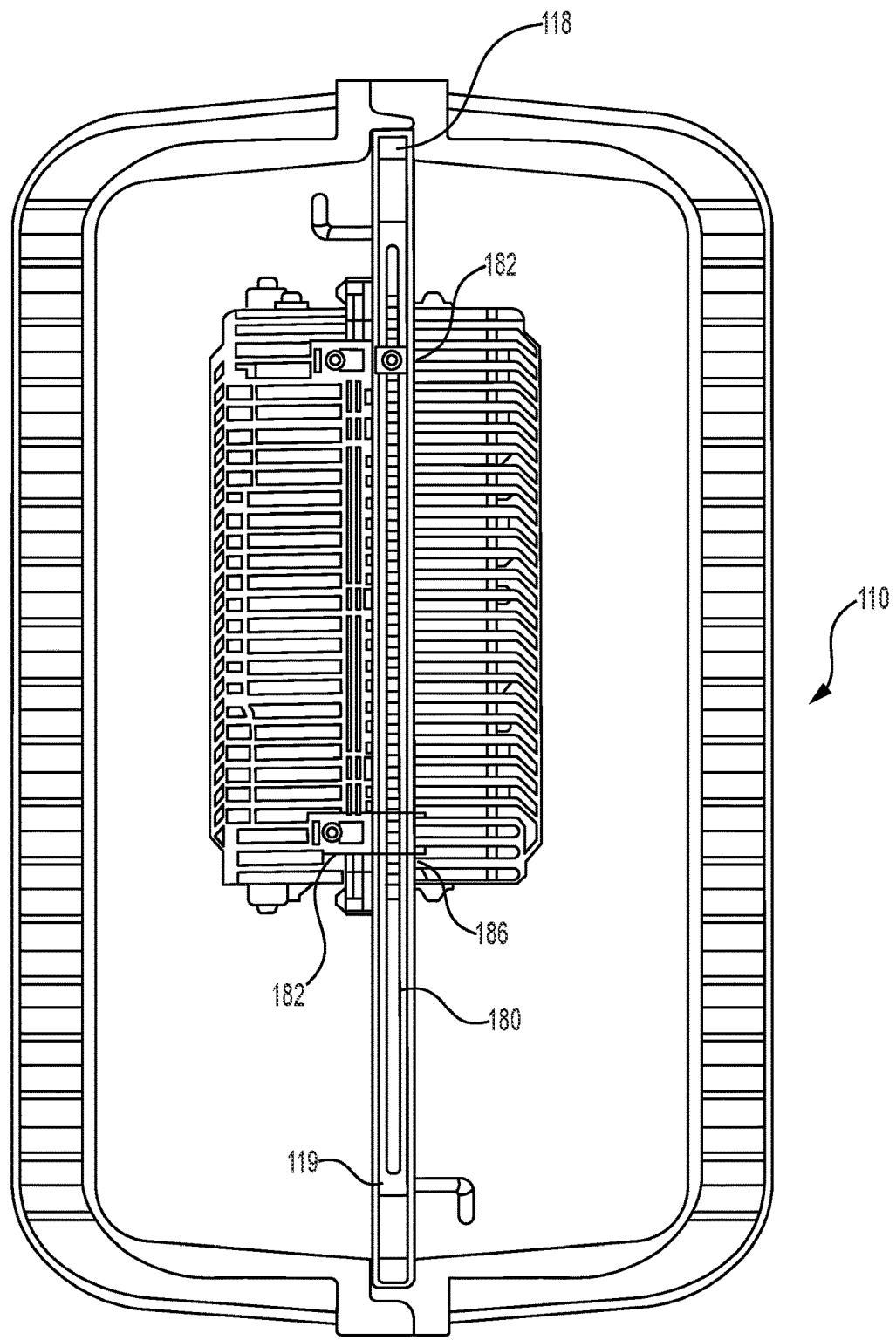
Figure 13:
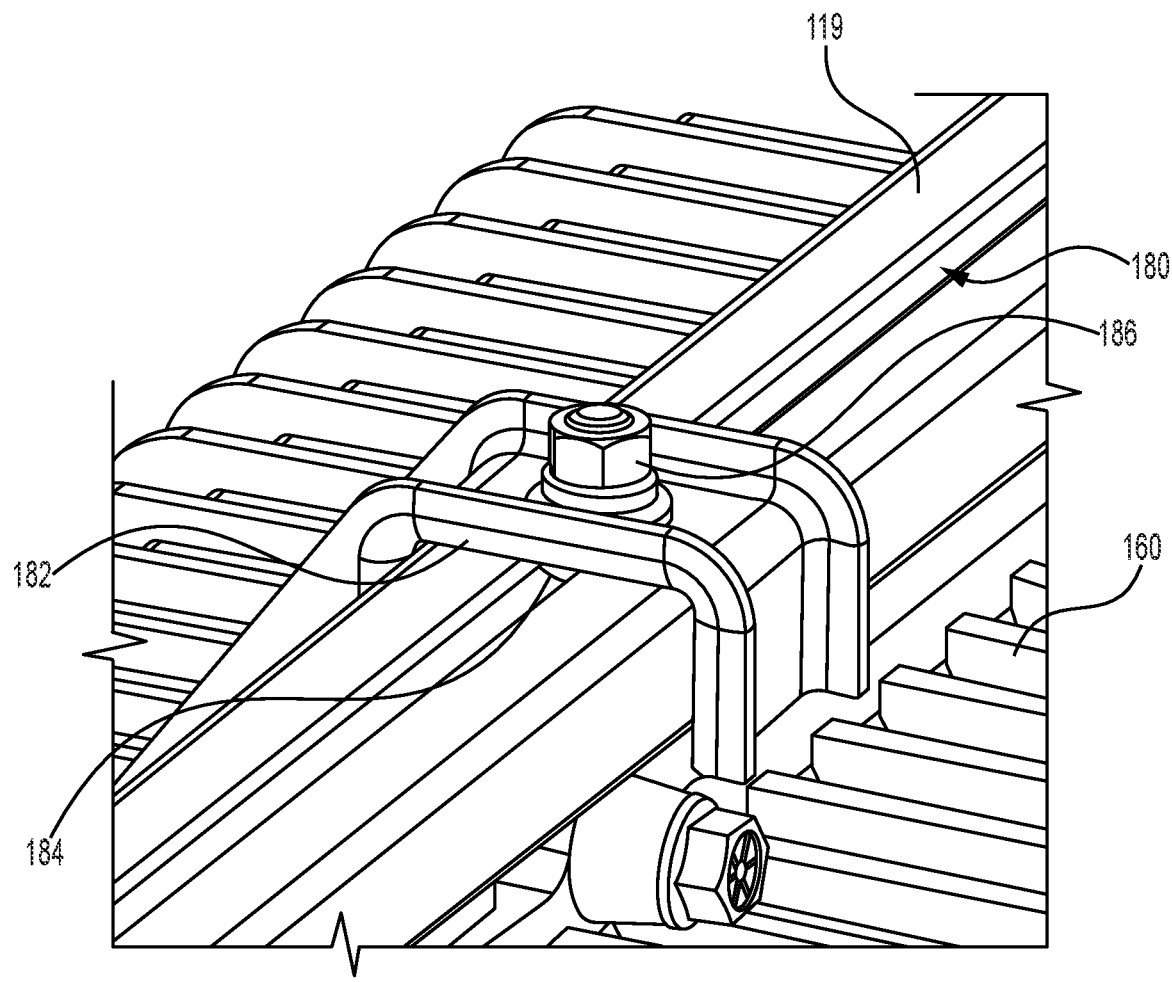
FIGS. 13 and 14 are enlarged perspective views of a connection between an electrical component and a crossbeam of the box of the node pedestal of FIG. 1.
Figure 14:
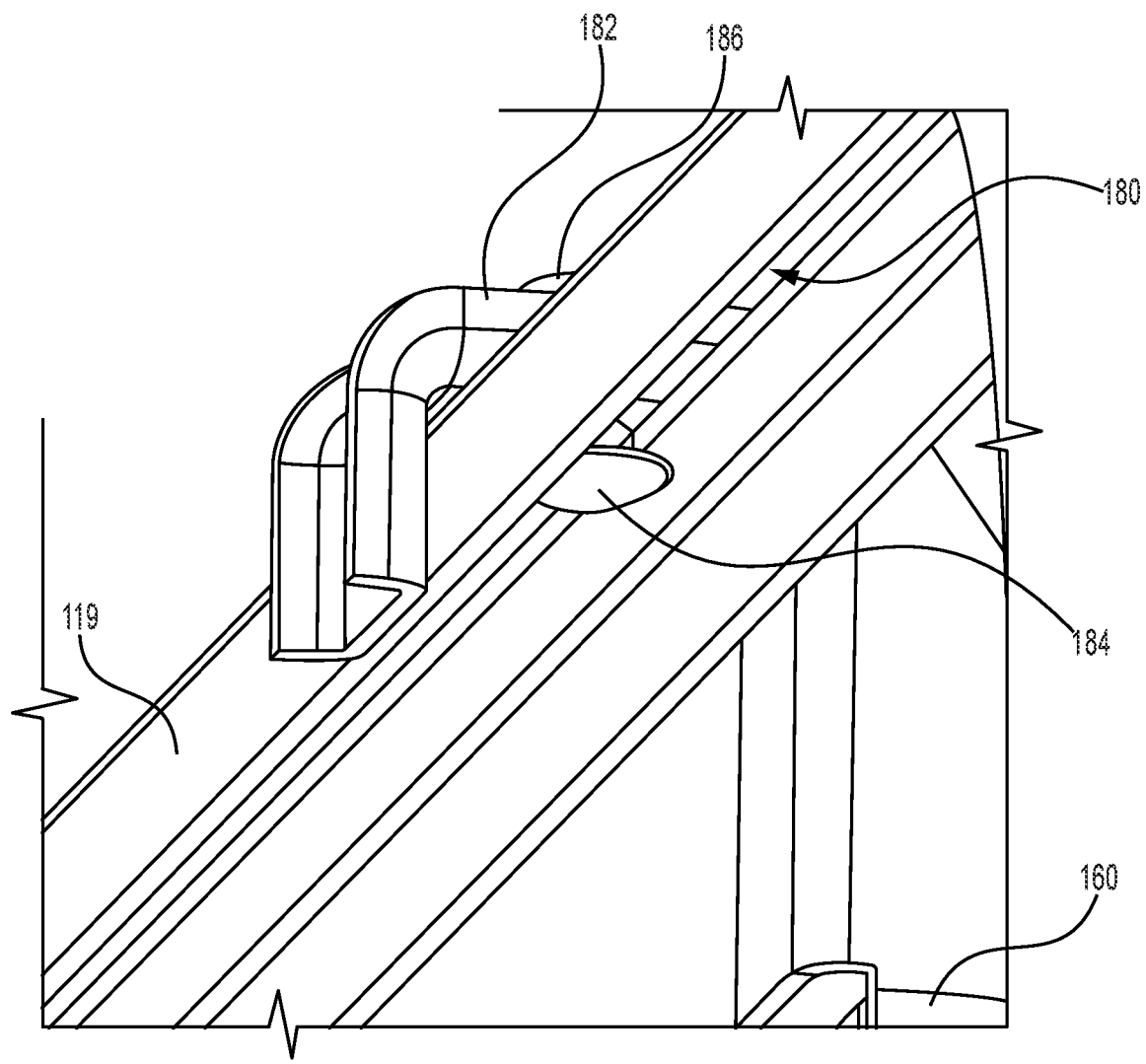

Referring now to FIGS. 11-14, the electrical component 160 is shown coupled with the horizontal crossbeam 119 of the box 110. As illustrated in FIG. 12, the crossbeam 119 has an elongated slot 180 extended along a majority of a length of the crossbeam 119. As best illustrated in FIGS. 13 and 14, the electrical component 160 includes a hook portion 182 having a substantially U-shaped configuration that is configured to receive and be placed over the crossbeam 119. The hook portion 182 includes a through hole (not shown) that is configured to receive a carriage bolt 184, and a nut 186 can be threadedly coupled with the bolt 184 to secure the electrical component 160 to the box 110 at a desired position along the length of the crossbeam 119. In some aspects, the electrical component 160 may have two hook portions 182 coupled with the crossbeam 119.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A node pedestal having a coupling portion configured to permit access to an interior of the node pedestal, comprising:
   a base portion configured to house communication system components;
   a housing portion configured to be removably coupled with the base portion, the housing portion having opposite first and second wall portions;
   a first support portion configured to extend from a first end of the base portion and a second support portion configured to extend from a second end of the base portion opposite to the first end;
   a coupling portion configured to couple the housing portion with the base portion;
   wherein the coupling portion comprises a first latching portion and a second latching portion;
   wherein the first latching portion includes a first engagement portion rotatingly mounted to an inner surface of the first wall portion and a second engagement portion extending from the first support portion toward the second support portion;
   wherein the second latching portion includes a first engagement portion rotatingly mounted to an inner surface of the second wall portion and a second engagement portion extending from the second support portion toward the first support portion;
   wherein the first engagement portion of the first latching portion is configured to engage the second engagement portion, and the first engagement portion of the second latching portion is configured to engage the second engagement portion of the second latching portion to securely couple the housing portion to the base portion;

wherein the first engagement portion of the first latching portion is configured to be coupled with the first wall portion such that the first engagement portion of the first latching portion is rotatable relative to the first wall portion about a rotation axis that is perpendicular to the first wall portion, and the first engagement portion of the second latching portion is configured to be coupled with the second wall portion such that the first engagement portion of the second latching portion is rotatable relative to the second wall portion about a rotation axis that is perpendicular to the second wall portion;

wherein the first latching portion includes a first torsion spring configured to urge the first engagement portion of the first latching portion in a counter-clockwise direction about the rotation axis to a rest position, and wherein the second latching portion includes a second torsion spring configured to urge the first engagement portion of the second latching portion in a counter-clockwise direction about the rotation axis to a rest position;

wherein the first engagement portion of the first latching portion is configured to rotate in a clockwise direction against the urging of the spring when the first engagement portion of the first latching portion engages the second engagement portion of the first latching portion when the housing is being coupled with the box;

wherein the first engagement portion of the second latching portion is configured to rotate in a clockwise direction against the urging of the spring when the first engagement portion of the second latching portion engages the second engagement portion of the second latching portion when the housing is being coupled with the box; and wherein the first engagement portion of the first latching portion is configured to move away from the second engagement portion of the first latching portion in a direction opposite to the second support portion when the second latching portion is unlatched and the housing portion is pivoted away from the second end of the base portion such that the first engagement portion of the first latching portion is unlatched from the second engagement portion of the first latching portion so as to permit the housing portion to be removed from the base portion.

2. The node pedestal of claim 1, wherein the first wall portion includes a first groove configured the first support portion and the second wall portion includes a second groove configured to receive the second support portion.

3. The node pedestal of claim 2, wherein the first and second grooves comprise tapered grooves that are structured and arranged to align with the respective first and second supports of the base portion when the housing portion is coupled with the base portion.

4. The node pedestal of claim 1, wherein the first latching portion or the second latching portion includes a keyed lock accessible from outside of the first wall portion or the second wall portion of the housing portion.

5. A node pedestal having a coupling portion configured to permit access to an interior of the node pedestal, comprising:
a base portion;
a housing portion configured to be removably coupled with the base portion;
a first support portion configured to extend from a first end of the base portion and a second support portion configured to extend from a second end of the base portion opposite to the first end;
a latching portion configured to couple the housing portion with the base portion;
wherein the latching portion includes a first engagement portion rotatingly mounted to an inner surface of the first wall portion and a second engagement portion extending from the first support portion toward the second support portion;
wherein the first engagement portion is configured to be coupled with the second engagement portion to couple the housing portion to the base portion;
wherein the first engagement portion is configured to be coupled with the first wall portion such that the first engagement portion is rotatable relative to the first wall portion about a rotation axis that is perpendicular to the first wall portion;
wherein the latching portion includes a torsion spring configured to urge the first engagement portion in a counter-clockwise direction about the rotation axis to a rest position;
wherein the first engagement portion is configured to rotate in a clockwise direction against the urging of the spring when the first engagement portion engages the second engagement portion when the housing is being coupled with the box; and
wherein the first engagement portion is configured to move away from the second engagement portion in a direction opposite to the second support portion when the housing portion is pivoted away from the second end of the base portion such that the first engagement portion is unlatched from the second engagement portion so as to permit the housing portion to be removed from the base portion.

6. The node pedestal of claim 5, wherein the base portion is configured to house communication system components.

7. The node pedestal of claim 5, further comprising a second latching portion configured to couple the housing portion with the base portion.

8. The node pedestal of claim 7, wherein the second latching portion includes a first engagement portion rotatingly mounted to an inner surface of the second wall portion and a second engagement portion extending from the second support portion toward the first support portion; and
wherein the first engagement portion of the second latching portion is configured to be coupled with the second engagement portion of the second latching portion to couple the housing portion to the base portion.

9. The node pedestal of claim 7, wherein the first latching portion or the second latching portion includes a keyed lock accessible from outside of the first wall portion or the second wall portion of the housing portion.

10. The node pedestal of claim 8, wherein the first engagement portion of the second latching portion is configured to be coupled with the second wall portion such that the first engagement portion of the second latching portion is rotatable relative to the second wall portion about a rotation axis that is perpendicular to the second wall portion.

11. The node pedestal of claim 10, wherein the second latching portion includes a torsion spring configured to urge the first engagement portion in a counter-clockwise direction about the rotation axis to a rest position; and
wherein the first engagement portion is configured to rotate in a clockwise direction against the urging of the spring when the first engagement portion engages the second engagement portion when the housing is being coupled with the box.

12. The node pedestal of claim 5, wherein the first wall portion includes a first groove configured the first support portion and the second wall portion includes a second groove configured to receive the second support portion.

13. The node pedestal of claim 12, wherein the first and second grooves comprise tapered grooves that are structured and arranged to align with the respective first and second supports of the base portion when the housing portion is coupled with the base portion.

\* \* \* \* \*